US012767351B2

(12) United States Patent
Mohta et al.

(10) Patent No.: US 12,767,351 B2
(45) Date of Patent: Oct. 20, 2026

(54) MECHANICALLY SEALED LED CAVITIES FOR UNMANNED AERIAL VEHICLE (UAV) ATTACHMENTS

(71) Applicant: Skydio, Inc., San Mateo, CA (US)

(72) Inventors: Shantanu Mohta, Sunnyvale, CA (US); Zachary Albert West, Mountain View, CA (US); Benjamin Scott Thompson, San Carlos, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/214,514

(22) Filed: May 21, 2025

(65) Prior Publication Data

US 2025/0361025 A1 Nov. 27, 2025

Related U.S. Application Data

(60) Provisional application No. 63/650,112, filed on May 21, 2024.

(51) Int. Cl.

| | |
|---|---|
| ***B64D 47/04*** | (2006.01) |
| ***B64U 20/83*** | (2023.01) |
| ***F21S 41/151*** | (2018.01) |
| ***F21S 41/19*** | (2018.01) |
| ***F21S 41/20*** | (2018.01) |
| ***F21S 41/29*** | (2018.01) |
| ***F21S 45/47*** | (2018.01) |
| ***F21S 45/50*** | (2018.01) |
| *B64U 10/14* | (2023.01) |
| *F21W 107/30* | (2018.01) |

(Continued)

(52) U.S. Cl.
CPC ............. *B64D 47/04* (2013.01); *B64U 20/83* (2023.01); *F21S 41/151* (2018.01); *F21S 41/19* (2018.01); *F21S 41/2805* (2024.05); *F21S 41/29* (2018.01); *F21S 45/47* (2018.01); *F21S 45/50* (2018.01); *B64D 2203/00* (2013.01); *B64U 10/14* (2023.01); *F21W 2107/30* (2018.01); *F21Y 2107/40* (2016.08); *F21Y 2115/10* (2016.08)

(58) Field of Classification Search
CPC .... B64D 47/04; B64D 2203/00; B64D 47/06; B64U 20/83; B64U 10/14; F21S 41/151; F21S 41/19; F21S 41/2805; F21S 41/29; F21S 45/47; F21S 45/50; F21W 2107/30; F21Y 2107/40; F21Y 2115/10
See application file for complete search history.

(56) References Cited

U.S. PATENT DOCUMENTS 8,246,203 B2 * 8/2012 Hancock .................. F21S 8/04 362/249.02
8,550,653 B2 * 10/2013 Wilson .................... F21V 23/06 362/183

(Continued)

*Primary Examiner* — Evan P Dzierzynski

(57) ABSTRACT

A mechanically sealed LED assembly is designed for enhanced ingress protection in UAV night flight modules. The assembly includes multiple LEDs enclosed within sealed cavities to prevent dust and water ingress, ensuring safe operation in various environmental conditions. An ingress protection stack, comprising an LED base layer, seal components, a baffle, and cover glass, provides additional protection. The seal components are compressed against the LED base layer by the baffle, enhancing the assembly's durability and performance. This design allows for enhanced optical power output while maintaining protection from environmental elements.

23 Claims, 15 Drawing Sheets

(51) Int. Cl.

*F21Y 107/40* (2016.01)
*F21Y 115/10* (2016.01)

(56) References Cited

U.S. PATENT DOCUMENTS

| | | | | |
|---|---|---|---|---|
| 9,285,109 | B1 * | 3/2016 | Olsson | F21V 29/70 |
| 12,222,095 | B1 * | 2/2025 | Emerson | F21V 29/60 |
| 2017/0201738 | A1 | 7/2017 | Lacaze et al. | |
| 2017/0211721 | A1 * | 7/2017 | Ritter | F16K 31/602 |
| 2019/0096932 | A1 | 3/2019 | Hseih et al. | |
| 2019/0108785 | A1 * | 4/2019 | Green | G09G 3/32 |
| 2020/0140085 | A1 | 5/2020 | Deng et al. | |
| 2020/0209893 | A1 | 7/2020 | Lee et al. | |
| 2021/0285618 | A1 * | 9/2021 | Bao | F21K 9/68 |
| 2021/0375977 | A1 | 12/2021 | Lee et al. | |
| 2021/0400210 | A1 | 12/2021 | Thibault et al. | |
| 2022/0202294 | A1 | 6/2022 | Razmara et al. | |
| 2022/0404008 | A1 * | 12/2022 | Schimke | F21V 29/77 |
| 2023/0020142 | A1 | 1/2023 | Chevalier et al. | |
| 2023/0177712 | A1 | 6/2023 | Kang et al. | |
| 2023/0343228 | A1 | 10/2023 | Lee | |
| 2024/0288877 | A1 | 8/2024 | Li et al. | |
| 2024/0338025 | A1 | 10/2024 | Everhard et al. | |

* cited by examiner

MECHANICALLY SEALED LED CAVITIES FOR UNMANNED AERIAL VEHICLE (UAV) ATTACHMENTS

CROSS-REFERENCE TO RELATED APPLICATION(S)

This application claims the benefit of U.S. Provisional Patent Application No. 63/650,112, filed May 21, 2024, the entire disclosure of which is hereby incorporated by reference.

TECHNICAL FIELD

The present disclosure relates to unmanned aerial vehicle (UAV) attachments, more specifically to mechanically sealed LED cavities for improved ingress protection in UAV attachments, particularly for night flight modules.

BACKGROUND

Unmanned Aerial Vehicles (UAVs), commonly known as drones, have become increasingly popular for a variety of applications, ranging from recreational use to complex industrial tasks. One of the critical aspects of UAV design is ensuring that they can operate effectively in diverse environmental conditions. This includes the ability to withstand exposure to dust, water, and other environmental factors that could potentially damage sensitive components such as LEDs used in night flight modules. The need for robust ingress protection is paramount to ensure the longevity and reliability of these components, especially when UAVs are deployed in harsh or unpredictable environments.

LEDs are often used in UAVs for illumination and signaling purposes, particularly in night-time operations. However, these components are vulnerable to environmental damage, which can compromise their performance and the overall functionality of the UAV. Traditional methods of protecting LEDs involve various sealing techniques, but these can sometimes fall short in providing the necessary ingress protection. In some implementations, LEDs are coated with nano-coating or conformal coating, which is standard on some UAVs, but these are not useful, especially for high power LEDs, because they are either not rated to a high enough temperature or they would reduce illumination transmission. These and other drawbacks exist. As UAVs continue to be used in more demanding applications, there is a growing need for innovative solutions that can offer enhanced protection for LED components while maintaining their efficiency and effectiveness.

SUMMARY

The embodiments include a mechanically sealed light emitting diode (LED) assembly designed for enhanced protection against dust and water in an Unmanned Aerial Vehicle (UAV) night flight module. The LED assembly can consist of multiple LEDs enclosed within sealed cavities to prevent environmental ingress and allow operation in various environmental conditions without damaging the LEDs. The LED cavities may be configured to create dry zones for the LEDs. An ingress protection stack can be part of the assembly, comprising several components like an LED base layer, seal components, a baffle, and cover glass. The seal components may be compressed against the LED base layer by the baffle to ensure ingress protection.

The LED assembly may be specifically arranged on a UAV night flight module, enhancing its functionality. The night flight module may be detachably attachable to the UAV. The LED cavities can be specially designed to enhance (e.g., maximize) the optical power output of the LEDs, ensuring efficient performance, and also block peripheral light to reduce glare or reflections that may interfere with one or more cameras of the UAV.

The ingress protection stack may also include a heat dissipating component (e.g., heatsink), with the baffle mechanically secured through the LED base layer to the heat dissipating component. This configuration can ensure good thermal conduction by establishing a thermal contact between the LED base layer and the heat-dissipating component that aids in dissipating any heat generated by the LEDs.

The cover glass of the assembly may include an adhesive layer, which can be used to bond the cover glass to the baffle, enhancing the structural integrity of the assembly.

The LED base layer can serve as the foundational layer of the ingress protection stack, while the cover glass may act as the exterior layer, providing a robust protective barrier.

The seal components of the assembly may be a multi-layer component including a silicone rubber compressible element for providing air-tight sealing, a stainless steel stiffener for structural support, and an adhesive layer for bonding, contributing to the overall ingress protection.

The baffle used in the assembly can be made of aluminum, offering durability, strength to the structure, and thermal conductivity.

The embodiments may also encompass a UAV night flight module that includes the mechanically sealed LED assembly, integrating it into the UAV's design.

A method for providing improved ingress protection for an LED assembly in a UAV night flight module can involve enclosing multiple LEDs within sealed cavities to prevent environmental ingress and configuring the cavities to create dry zones. The method may also include providing an ingress protection stack with various components, compressing seal components against the LED base layer, and ensuring thermal conduction through a heatsink.

The method can further involve arranging the LED assembly on the UAV night flight module and designing the LED cavities to enhance (e.g., maximize) optical power output. The ingress protection stack may include a cover glass with an adhesive layer for bonding to the baffle, and the LED base layer and cover glass can serve as the foundational and exterior layers, respectively.

The seal components in the method may include a silicone rubber compressible seal, a stainless steel stiffener, and an adhesive layer, while the baffle can be made of aluminum.

The embodiments may also include a UAV with the night flight module, allowing it to operate in various environmental conditions without risking damage to the LEDs. The LED assembly can be designed to provide enhanced optical power output while preventing environmental ingress.

Various other aspects, features, and advantages of the disclosed embodiments will be apparent through the detailed description and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION

Figure 1:
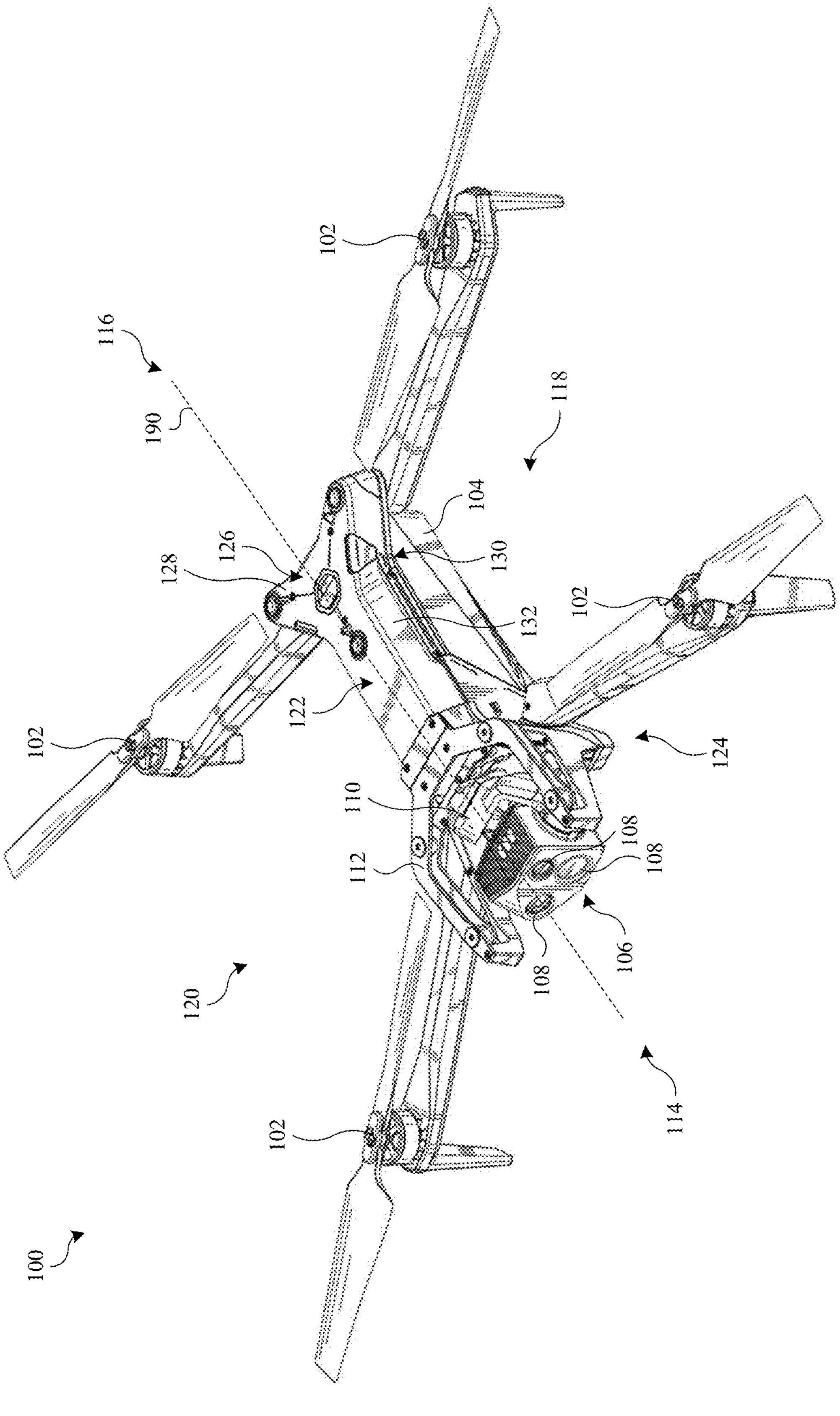
FIG. 1 is a top perspective view of an exemplary UAV.

The disclosure provides a mechanically sealed light emitting diode (LED) assembly designed for enhanced ingress protection in unmanned aerial vehicle (UAV) night flight modules. The core components include a multi-stack ingress protection stack that may comprise an LED base layer, seal component assembly, a baffle, and a cover glass. The LED assembly can be arranged on a UAV night flight module, where the LEDs are enclosed within specially designed sealed cavities to prevent environmental ingress, such as dust and water ingress, while ensuring enhanced optical power output. The night flight module may be detachably attached to the UAV and one or more night flight modules may be attached to the UAV. The seal component assembly may include a silicone rubber compressible seal, a stainless steel stiffener, and an adhesive layer, which are compressed against the LED base layer by the baffle to provide environmental ingress protection. The baffle, potentially made of a thermally conductive material, such as aluminum, can be mechanically secured (e.g., screwed) through the LED base layer to a heat dissipating component (e.g., heatsink), ensuring thermal conduction. The cover glass may be bonded to the baffle using an adhesive layer, serving as the exterior layer of the stack. This configuration allows the UAV to operate in varied environmental conditions without risking damage to the LEDs, maintaining high optical output.

According to an embodiment, the ingress protection stack may be provided to ensure the protection of the LED assembly from environmental ingress (e.g., dust and water). The LED assembly may be enclosed within sealed LED cavities, which may prevent environmental ingress and allow the system to operate in varied environmental conditions without risking damage to the LEDs. The seal components may be compressed against the LED base layer by the baffle, which may provide the ingress protection. The multi-layer stack for ingress protection (e.g., illustrated in the following figures) show how the components interact to achieve the desired protection. The baffle may be mechanically secured (e.g., screwed) through flexible printed circuit (FPC) to a heatsink, which may ensure thermal conduction by compressing the seal against the FPC. The LEDs may be sealed inside specially designed LED cavities, which may ensure optical power output while preventing dust or water ingress. The ingress protection stack may comprise a multi-layer stack, including the LED base layer, seal components assembly, baffle, and cover glass, which may work together to provide the ingress protection. The baffle may be used to compress the seal against the FPC, ensuring thermal conduction. The cover glass may have an adhesive layer used to bond it to the baffle, serving as the exterior layer and providing additional protection. The seal components assembly may be a multi-layer component comprised of three parts: a silicone rubber compressible seal, a stainless steel stiffener, and an adhesive layer, which may provide a robust seal for ingress protection. The system may include components such as the flexible printed circuit assembly (FPCA) with LEDs, a silicone seal with a compressible seal, a stainless steel stiffener, and an adhesive layer, an aluminum baffle, a heatsink, and a cover glass with an adhesive layer. These components may interact to provide ingress protection by sealing the LEDs from dust and water and ensuring thermal conduction.

In the context of the UAV night flight module, the LED assembly may be arranged on a night flight module UAV attachment. This configuration may ensure that the UAV is operational in varied environmental conditions without risking damage to the LEDs. The LED cavities may be sealed inside specially designed structures that are configured to ensure prevention of dust or water ingress, as described with reference to the figures below. The sealed LED cavities create dry zones that allow the UAV to operate in varied environmental conditions without risking damage to the LEDs. The arrangement of the LED assembly on the UAV night flight module may also facilitate the enhancement (e.g., maximization) of optical power output. Thus, the above arrangement of the LED assembly in the night flight module not only ensures that the LEDs are protected from environmental ingress in varied environmental conditions but also maintains high optical output, or enhances optical output, to illuminate one or more cameras of the UAV to aid in navigating the UAV (e.g., in low-illumination or night conditions).

Figure 2:
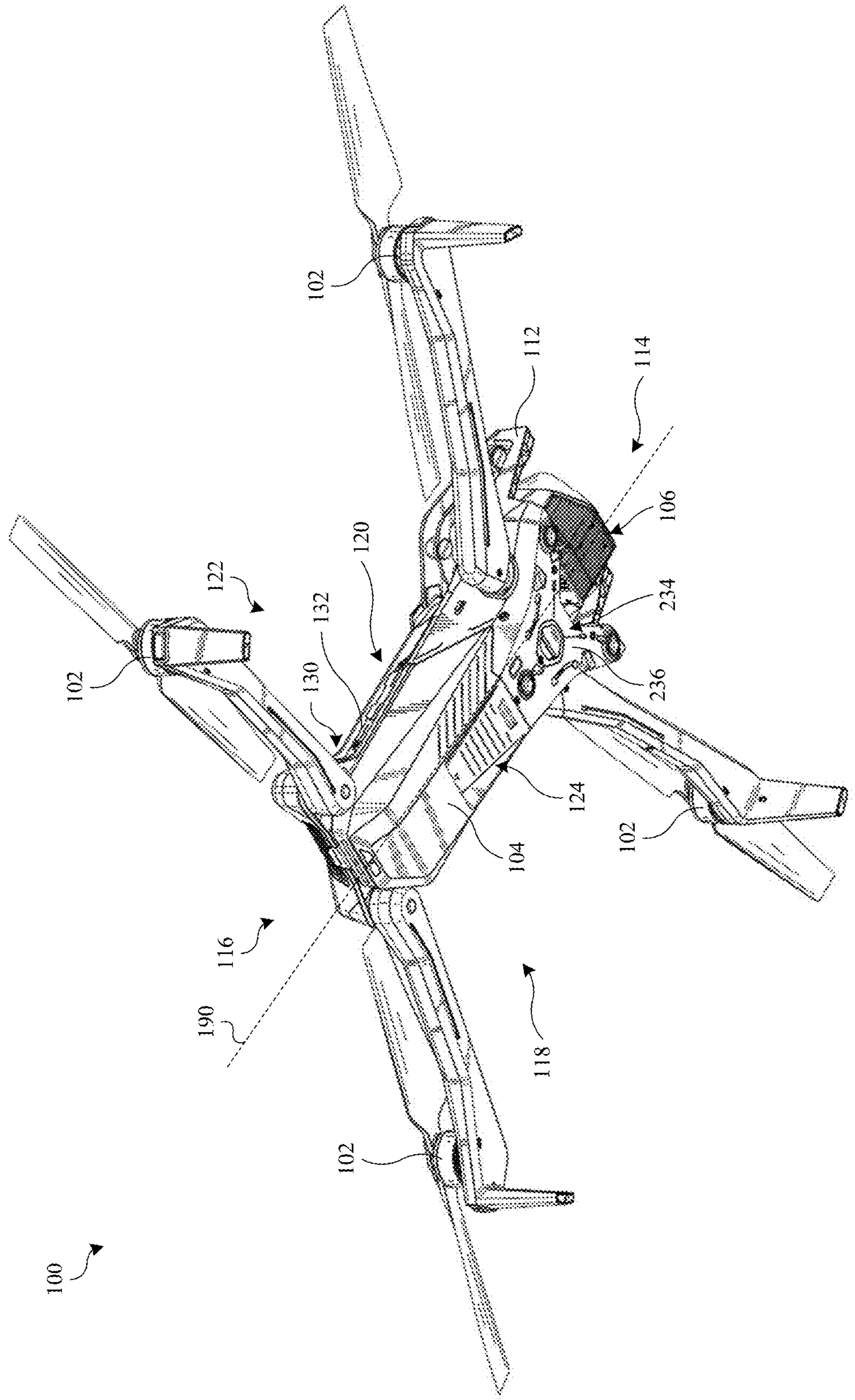
FIG. 2 is a bottom perspective view of the UAV of FIG. 1.

Turning now to the figures, FIG. 1 illustrates a top perspective view of an unmanned aerial vehicle (UAV) 100. FIG. 2 illustrates a bottom perspective view of the UAV 100.

The UAV 100 may include one or more propulsion mechanisms 102 and a power source, such as a battery coupled to the UAV 100. The UAV 100 may be configured for autonomous landing and/or docking with a docking station. To support the autonomous landing and/or docking, the UAV 100 may follow any suitable processes or procedures, or may include one or more components, such as those described in U.S. application Ser. No. 16/991,122, filed Aug. 12, 2020, and U.S. Provisional Application No. 63/527,261, filed on Jul. 17, 2023, the entire disclosures of which are hereby incorporated by reference for all purposes.

The propulsion mechanisms 102 may include any components and/or structures suitable for supporting flight of the UAV 100. For example, as shown in FIGS. 1 and 2, the propulsion mechanisms 102 may be or may include propeller assemblies having one or more blades connected to hubs of the UAV 100. The one or more blades may be propelled by a motor to rotate the one or more blades and facilitate flight of the UAV 100, whereby the motor may be powered by a power source of the UAV 100, such as the battery 104. It should be appreciated, however, that the configuration and/or structure of the UAV 100 may vary depending on the particular configuration of the UAV 100, and as such, the UAV 100 shown in FIG. 1 is not intended to limit the structure of the UAV 100.

As mentioned above, the UAV 100 may be configured using various processes or protocols to autonomously land (e.g., on a docking station), to autonomously take flight (e.g., from a docking station), or both. To facilitate autonomous landing and/or autonomous flight, the UAV 100 may include one or more sensors, such as image sensors, that are configured to monitor a position of the UAV 100 and/or detect a specified image, such as a fiducial disposed on a docking station. For example, during a landing sequence (e.g., a docking sequence) of the UAV 100, the image sensors of the UAV 100 may detect an image, such as the fiducial disposed on the docking station, to properly align and guide the UAV 100 to dock.

The UAV 100 may further include a camera system 106. The camera system 106 may be configured to detect, monitor, capture, record, or a combination thereof one or more images. The camera system 106 may be configured to facilitate autonomous or user-controlled flight of the UAV 100. For example, the camera system 106 may include one or more cameras 108. The cameras 108 may capture a live feed of an environment during flight, whereby a user via a user interface (e.g., a controller) may control the UAV 100 based upon the live feed of the environment. Alternatively, or additionally, the cameras 108 may capture images of the environment and/or monitor the environment in real-time to autonomously fly through the environment. It should be noted that the cameras 108 and the camera system 106 are not limited to any particular configuration, and any types of camera configurations (e.g., wide-angle, high-resolution, etc.) may be implemented in the UAV 100.

The camera system 106 may be operable via a gimbal system 110 coupled to the camera system 106. The gimbal system 110 may be configured to be controlled autonomously or via a user interface (e.g., a controller) to orient or otherwise move the camera system 106 (e.g., the cameras 108) relative to the UAV 100. The gimbal system 110 may include one or more arms and one or more pivot joints that facilitate movement of the camera system 106 relative to the UAV 100.

The gimbal system 110 and the camera system 106 may be coupled to the UAV 100 by a mounting bracket 112. The mounting bracket 112 may be coupled to the UAV 100 by one or more fasteners or other mechanical connection means to secure the gimbal system 110 and the camera system 106 to the UAV 100. The mounting bracket 112 may be coupled to any portion of the UAV 100. By way of example, as shown in FIGS. 1 and 2, the mounting bracket 112 may be coupled to a front 114 (i.e., a front side) of the UAV 100 or a top 122 (i.e., a top side) of the UAV 100 such that the camera system 106 may be positioned in the front 114 of the UAV 100.

That is, the camera system 106 may be located at the front 114 (i.e., the front side) of the UAV 100 so that the cameras 108 may capture an environment in front of the UAV 100 with respect to a forward direction of travel of the UAV 100 (e.g., a direction of travel of the UAV 100 that is substantially parallel to the ground or along the ground). However, in certain configurations, the camera system 106 may also be coupled to another portion of the UAV 100, such as a rear 116 (i.e., rear side) of the UAV 100, a first side 118 of the UAV 100, a second side 120 of the UAV 100, a bottom 124 (i.e., a bottom side) of the UAV 100, or a combination or variation thereof.

As discussed in further detail below, one or more attachments may be coupled to the UAV 100 and operable with the UAV 100 to further customize a user experience of the UAV 100. That is, the one or more attachments may be coupled to the UAV 100 to provide additional functionality to the UAV 100. For example, the one or more attachments may be a global positioning system (GPS) attachment, a microphone and/or speaker attachment, a night vision attachment (e.g., infrared (IR) attachment), a spotlight attachment, a secondary power source attachment (e.g., a secondary battery similar to the battery 104), an antenna or other radio accessory, a secondary camera system similar to or different from the camera system 106, a computer module, or a combination thereof. Thus, it is envisioned that any type of attachments or arrangement of multiple attachments may be configured for securement to the UAV 100. Additionally, as discussed in further detail below, the UAV 100 or a system thereof may be dynamic such that one or more characteristics (e.g., features, functionalities, operations, etc.) of the UAV 100 may be automatically and dynamically adjusted based upon a type of attachment coupled to the UAV 100.

To facilitate coupling one or more attachments to the UAV 100, the UAV 100 may include one or more attachment interfaces. As shown in FIGS. 1 and 2, the UAV 100 may include a plurality of attachment interfaces located on the UAV 100. For example, the UAV 100 may include a top attachment interface 126 located on the top 122 (i.e., the top side) of the UAV 100, a side attachment interface 130 located on the first side 118 of the UAV 100, a side attachment interface 130 located on the second side 120 of the UAV 100 that opposes the first side 118, and a bottom attachment interface 234 located on the bottom 124 (i.e., the bottom side) of the UAV 100.

To further illustrate positioning of such attachment interfaces, as shown in FIGS. 1 and 2, the UAV 100 (e.g., a body of the UAV 100 from which the propulsion mechanisms 102 extend) may extend along a longitudinal axis 190 of the UAV 100 from the front 114 of the UAV 100 to the rear 116 of the UAV 100. That is, the UAV 100 may extend from a first end (e.g., the front 114, which may be considered a forward end of the UAV 100) to an opposing second end (e.g., the rear 116, which may be considered an aft end of the UAV 100) along the longitudinal axis 190, whereby a length of the UAV 100 or a body thereof may be measured from the first end to the second end.

Moreover, the first side 118 of the UAV 100 may oppose the second side 120 of the UAV 100 with respect to the longitudinal axis 190. The first side 118 and second side 120 may be located on opposing sides of the longitudinal axis 190. The first side 118 may be considered a port side of the UAV 100 and the second side 120 may be considered a starboard side of the UAV 100.

Based on the above relative orientations, it can be seen in FIGS. 1 and 2 that the attachment interfaces described above may be positioned in various locations with respect to the longitudinal axis 190 of the UAV 100. For example, the top attachment interface 126 and/or the bottom attachment interface 234 may be located on the top 122 (i.e., the top side) of the UAV 100 and may extend along the longitudinal axis 190 between the first end (e.g., the front 114 or forward end) and the second end (e.g., the rear 116 or aft end) of the UAV 100. Additionally, the side attachment interfaces 130 may be located on the first side 118 and the second side 120 of the UAV 100 such that the side attachment interfaces 130 may be located on opposing sides of the longitudinal axis 190. That is, a first one of the side attachment interfaces 130 may be located on the port side (e.g., the first side 118) of the UAV 100 and a second one of the side attachment interfaces 130 may be located on the starboard side (e.g., the second side 120) of the UAV 100 such that the side attachment interfaces 130 are located on opposing sides of the longitudinal axis 190.

It should be noted that the above relative orientations associated with the UAV 100 are provided for illustrative purposes and should not be construed as limiting the teachings herein. For example, although the front 114 of the UAV 100 may be considered the front end of the UAV 100 and the rear 116 of the UAV 100 may be considered the aft end of the UAV 100, such considerations do not mean that the UAV 100 only travels in a forward direction with the front 114 of the UAV 100 leading the travel. That is, the UAV 100 may travel in any direction (e.g., fore, aft, side-to-side between the port and starboard sides, in an elevational direction, etc.) with respect to the longitudinal axis 190.

Turning now back to the attachment interfaces, it should be noted that such attachment interfaces may be integrated into the UAV 100, such as a housing of the UAV 100, or may be connected to the UAV 100 to allow for attachment of various attachments. That is, the attachment interfaces may provide a connection means to easily and removably couple various attachments to the UAV 100.

By way of example, the top attachment interface 126 may include a top attachment surface 128. The top attachment surface 128 may be located on, or formed with, the top (i.e., the top side) of the UAV 100. The top attachment surface 128 may be configured to receive, support, or otherwise couple to—either directly or indirectly—various attachments. Similarly, the side attachment interfaces 130 may include a side attachment surface 132 located on, or formed with, the first side 118 and/or the second side 120 of the UAV 100. Moreover, the bottom attachment interface 234 may include a bottom attachment surface 236 located on, or formed with, the bottom 124 (i.e., the bottom side) of the UAV 100. Any number of these attachment surfaces may exist for any of the attachment interfaces. That is, an attachment interface may include more than one attachment surface (e.g., a first attachment surface and a second attachment surface).

Based on the above, one or more attachments may be coupled to the top 122 of the UAV 100, the bottom 124 of the UAV 100, the first side 118 of the UAV 100, the second side 120 of the UAV 100, or a combination thereof. Additionally, it is envisioned that the front 114 and/or the rear 116 of the UAV 100 may also in certain configurations include an additional attachment interface. For example, in certain configurations the UAV 100 may remove the camera system 106 from the front 114 of the UAV and couple the camera system 106 to the UAV 100 in another location (e.g., the rear 116). In such a configuration, the front 114 may include an attachment interface for further attachments.

It should also be noted that the attachment interfaces of the UAV 100 may be adapted for universal or common attachment techniques. That is, various types of attachments may be coupled to the same attachment interface. For example, the GPS attachment and the night vision attachment may both be configured to attach to the top attachment interface 126 and the bottom attachment interface 234. Additionally, more than one attachment may be coupled to the UAV 100 at one time and may be powered by the power source (e.g., the battery 104) of the UAV 100. For example, a first attachment (e.g., a GPS attachment) may be coupled to the top attachment interface 126 and a second attachment (e.g., a spotlight attachment) may be coupled to the side attachment interface 130 located on the first side 118 of the UAV 100. Moreover, the attachment interfaces may include one or more additional features, such as heat-sinking components or other cooling components. Based on the above, various configurations and customization may be possible based on the teachings herein.

Figure 3A:
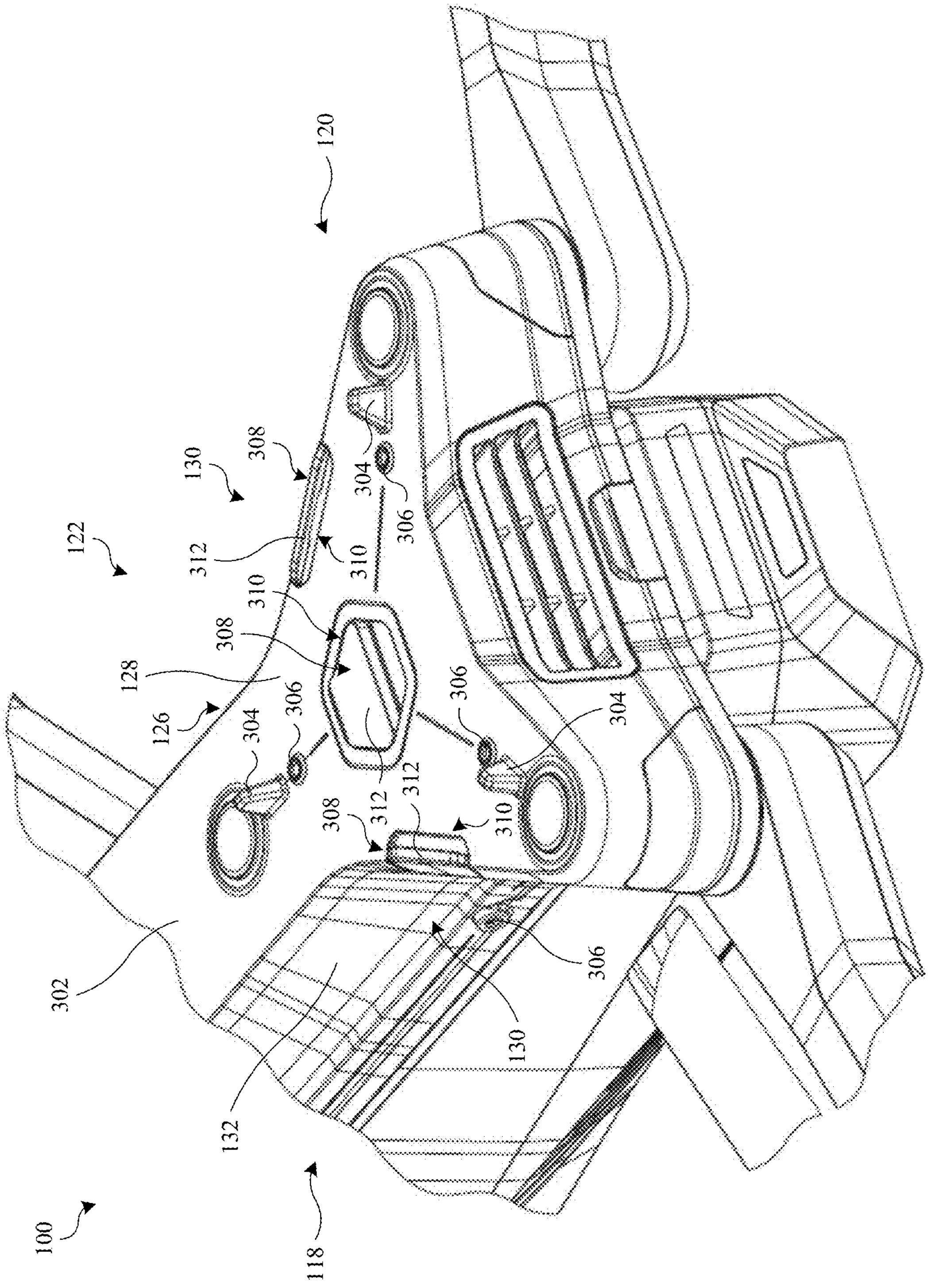
FIG. 3A is a close-up perspective view of the UAV of FIG. 1.
Figure 3B:
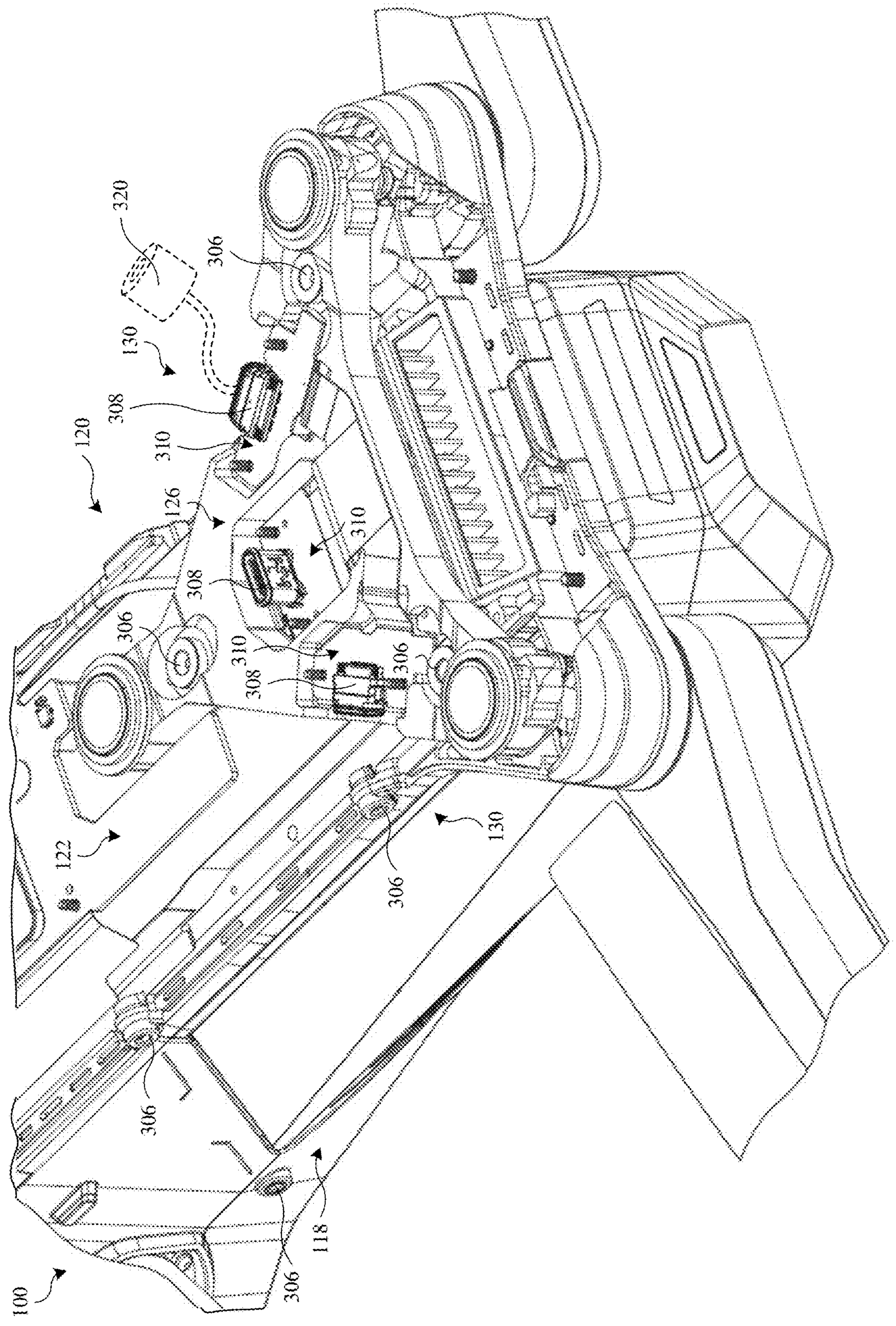
FIG. 3B is the close-up perspective view of FIG. 3A having a housing of the UAV removed.

FIG. 3A illustrates a close-up perspective view of the UAV 100 of FIG. 1. FIG. 3B illustrates another close-up perspective view of the UAV 100 of FIG. 1 with a housing 302 of the UAV 100 removed for further illustration. As discussed above, the UAV 100 may include one or more attachment interfaces, such as the top attachment interface 126 located on the top 122 (i.e., the top side) of the UAV 100 and the side attachment interface 130 located on the first side 118 of the UAV 100, as shown in FIGS. 3A and 3B.

The attachment interfaces (e.g., the top attachment interface 126, the side attachment interfaces 130, the bottom attachment interface 234, etc.) of the UAV 100 may be coupled to or formed with a portion of the UAV 100. By way of example, as discussed above, the attachment interfaces may include an attachment surface configured to receive or otherwise couple to the various attachments. For example, the top attachment interface 126 may include the top attachment surface 128 and the side attachment interface 130 of the first side 118 of the UAV 100 may include the side attachment surface 132.

Such attachment surfaces may be coupled to the housing 302 of the UAV 100 or may be integrally formed with the housing 302. That is, the housing 302 may be considered an outer shell or outer casing of the UAV 100 that defines one or more interior compartments of the UAV 100, whereby the interior compartments may substantially contain various components (e.g., electrical components, mechanical components, etc.) of the UAV 100. As shown in FIG. 3A, the top attachment surface 128 may be formed with—or form a portion of—a top portion (e.g., surface) of the housing 302 located on the top 122 of the UAV 100. Similarly, the side attachment surface 132 may be formed with—or form a portion of—a first side (e.g., surface) of the housing 302 located on the first side 118 of the UAV 100. Therefore, the attachments may be coupled directly or indirectly to the housing 302 of the UAV 100 via the attachment surfaces.

To facilitate such coupling of various attachments, the top attachment interface 126 may include one or more projections 304. The projections 304 may be configured to align an attachment with the top attachment surface 128. For example, the projections 304 may define a perimeter, such as a perimeter of the top attachment surface 128 or a portion thereof, whereby the attachment may be coupled to the top attachment surface 128 such that the attachment is located within and/or along the perimeter. That is, the attachment may be encompassed by the perimeter.

Similarly, the projections 304 may aid with alignment between an attachment and the top attachment surface 128. For example, as described in further detail below, the attachments may be coupled to the top attachment surface 128 using one or more fasteners. The projections 304 may aid in aligning an attachment with mounting holes 306 of the top attachment interface 126 so that the one or more fasteners may extend through the attachment and into respective ones of the one or more fasteners. That is, the mounting holes 306 may be positioned within (e.g., encompassed by) the perimeter defined by the projections 304 so that, when the attachment is located within (e.g., encompassed by) the perimeter, the mounting holes 306 align with the attachment to facilitate coupling the attachment to the top attachment surface 128.

The projections 304 are not limited to any particular size or shape. The projections 304 may extend away from the top attachment surface 128 and/or away from the UAV 100. The projections 304 may extend generally orthogonally to the top attachment surface 128 or may at any angle with respect to the top attachment surface 128. The projections 304 may have any geometry so facilitate guiding and/or locating the attachments with respect to the top attachment surface 128. For example, the projections 304 may each include a tapered surface, whereby the tapered surfaces of the projections 304 converge toward one another (e.g., converge toward a center region of the perimeter defined by the projections 304).

As discussed above, the top attachment interface 126 may be configured to mechanically couple various attachments to the UAV 100. The attachments may be advantageously coupled to the top attachment surface 128 in a removably manner to facilitate interchangeability, removal, and replacement of the attachments. In addition to mechanically coupling the various attachments to the UAV 100, the top attachment surface 128 may also electrically couple the various attachments to the UAV 100.

The top attachment interface 126 may include one or more connector ports 308. The connector ports 308 may be located on, or formed in, the top attachment surface 128. The connector ports 308 may be configured to receive an electrical connector of the various attachments. For example, the connector ports 308 may be configured to receive a universal serial bus (USB) connector, such as a USB-C connector of the attachments. However, the connector ports 308 may be configured to receive any type of connector, such as USB-A, USB-B, micro-USB, mini-USB, high-definition multimedia interface (HDMI), audio jack, the like, or a combination thereof.

The connector ports 308 may be configured to electrically couple the various attachments to the UAV 100. That is, an electrical system of the various attachments may be in communication with the electrical system of the UAV 100. As such, the various attachments may be configured to communicate (e.g., transmit) information to the UAV 100, such as intrinsic information pertaining to the various attachments. Similarly, the UAV 100 may communicate (e.g., transmit) information to the various attachments. Additionally, the various attachments, via the connector ports 308, may be powered by a power source of the UAV 100, such as the battery 104. Thus, the various attachments may interface with the UAV 100 such that the attachments may be operable in conjunction with the UAV 100.

The connector ports 308 of the top attachment interface 126 may be positioned anywhere along the top attachment surface 128 or another surface of the UAV 100. The connector ports 308 may project from the top attachment interface 126 or may be recessed from the top attachment interface 126. For example, the connector ports 308 may be positioned in a recess 310 defined by the top attachment surface 128 or another surface of the UAV 100. As such, an outermost surface of the connector ports 308 may be recessed from the top attachment surface 128. It should also be noted that any number of connector ports 308 and/or recesses 310 may be located on the top attachment surface 128.

The connector ports 308 may also be protected by a cover 312 when not in use by an attachment. The cover 312 may prevent moisture, debris, debris, dust, dirt, other potential contaminants, or a combination thereof from entering the connector ports 308. The cover 312 may be removable or otherwise repositionable to facilitate coupling the connector of an attachment to the connector ports 308. The cover 312 may be used for more than one of the connector ports 308 or each of the connector ports 308 may have their own one of the covers 312. It should also be noted that the in addition to, or in lieu of, the cover 312, one or more of the connector ports 308 may also be protected by other types of weatherproofing, such as a gasket, a foam material, a sealant material, or a combination thereof.

In addition to the top attachment interface 126 described above, the UAV 100 may also include the side attachment interfaces 130 shown in FIGS. 3A and 3B. A first of the side attachment interfaces 130 may be located on the first side 118 of the UAV 100 and a second of the side attachment interfaces 130 may be located on the second side 120 of the UAV 100. The first of the side attachment interfaces 130 may include the side attachment surface 132 which may be coupled to, or integrally formed with, the first side 118 of the UAV 100 (e.g., coupled to or integrally formed with a portion of the housing 302 on the first side 118 of the UAV 100). Similarly, the second of the side attachment interfaces 130 may include the side attachment surface 132 which may be coupled to, or integrally formed with, the second side 120 of the UAV 100 (e.g., coupled to or integrally formed with a portion of the housing 302 on the second side 120 of the UAV 100). Thus, various attachments may be coupled to the first side 118 and/or the second side 120 of the UAV 100 in a similar or different manner compared to the top attachment interface 126.

By way of example, the side attachment interfaces 130 may include additional ones of the mounting holes 306 that may be located on the side attachment surfaces 132. The mounting holes 306 may be the same or different than the mounting holes 306 of the top attachment surface 128. For example, the mounting holes 306 of the side attachment interfaces 130 may be configured to receive fasteners (e.g., threaded fasteners) to couple the attachments to the side attachment surfaces 132. As such, a location of the mounting holes 306 and/or a geometry of the mounting holes 306 is not particularly limited.

The side attachment interfaces 130 may also include one or more of the connector ports 308. The connector ports 308 may be located on the side attachment surfaces 132. Alternatively, or additionally, the connector ports 308 may be located on another surface of the UAV 100, such as the top attachment surface 128. Thus, all or a portion of the connector ports 308 located on the top attachment surface 128 may be considered part of the top attachment interface 126 and/or the side attachment interfaces 130, thereby providing further flexibility when coupling attachments to the UAV 100.

For example, the top attachment surface 128 may include a plurality of the connector ports 308, whereby a centrally located one of the connector ports 308 may be positioned within (e.g., encompassed by) the perimeter of the projections 304 and configured to couple an attachment to the top attachment surface 128. Additionally, the top attachment surface 128 may include another pair of the connector ports 308 positioned outside of the perimeter of the projections 304. The pair of the connector ports 308 may be located on the top attachment surface 128 and be positioned adjacent to the side attachment surfaces 132. As such, the connector ports 308 may be configured to electrically couple an attachment, such as the attachment 320, to the UAV 100 so that the attachment 320 may be mechanically (e.g., removably) coupled to the side attachment surface 132 located on the first side 118 and/or the second side 120.

Figure 4:
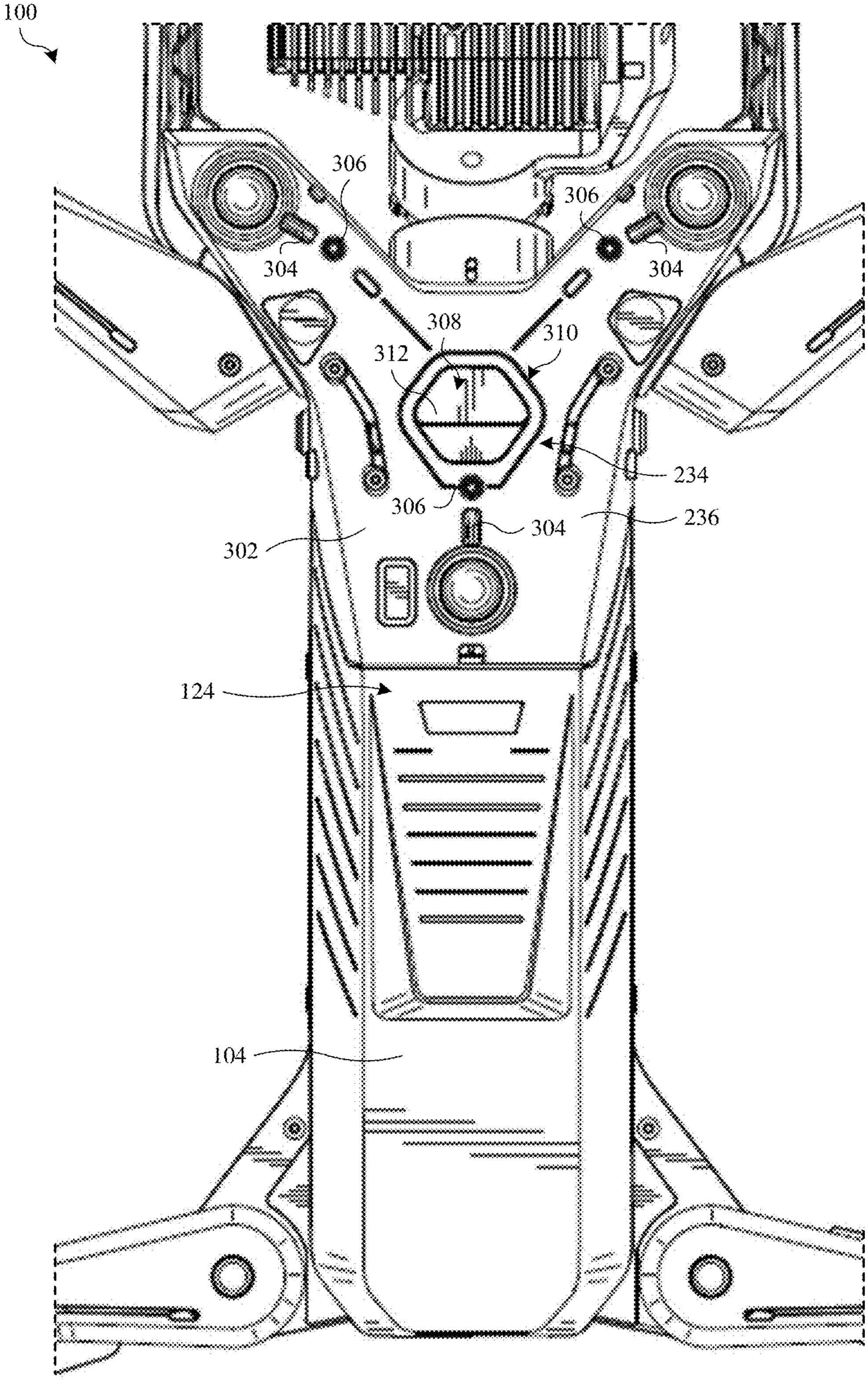
FIG. 4 is a close-up view of another attachment interface of the UAV of FIG. 1.

Based on the above, attachments such as the attachment 320 may be mechanically and/or electrically coupled to the first side 118, the second side 120, and the top 122 (i.e., the top side) of the UAV 100. Additionally, as shown in the close-up view of FIG. 4, the UAV 100 may also include the bottom attachment interface 234 to mechanically and/or electrically couple attachments to the bottom 124 (i.e., the bottom side) of the UAV 100.

As discussed above, the bottom attachment interface 234 may include the bottom attachment surface 236. The bottom attachment surface may be coupled to, or located on the bottom 124 (i.e., the bottom side) of the UAV 100. For example, the bottom attachment surface 236 may be coupled to, or integrally formed with, a portion of the housing 302 of the UAV 100 located on the bottom 124 of the UAV 100. The bottom attachment surface 236 may be positioned adjacent to and/or may abut the battery 104 of the UAV 100 so that an attachment coupled to the bottom attachment surface 236 may be free of obstruction of the battery 104.

The bottom attachment interface 234 may include one or more of the projections 304. The projections 304 of the bottom attachment interface 234 may be located on the bottom attachment surface 236. The projections 304 of the bottom attachment interface 234 may be similar to the projections 304 of the top attachment interface 126 as described above. For example, the projections 304 of the bottom attachment interface 234 may define a perimeter around or on the bottom attachment surface 236, whereby an attachment may be configured to be aligned and located within (e.g., encompassed by) and/or along the perimeter to couple the attachment to the bottom attachment surfaces 236 via one or more fasteners extending into mounting holes 306 of the bottom attachment interface 234. The mounting holes 306 may be similar to the mounting holes 306 described above.

The bottom attachment interfaces 234 may also electrically couple various attachments to the UAV 100 via another one of the connector ports 308 located on the bottom attachment surface 236. The connector port 308 of the bottom attachment interface 234 may be positioned within (e.g., encompassed by) the perimeter of the projections 304. For example, the mounting holes 306 may be located within (e.g., encompassed by) the perimeter of the projections 304 adjacent to the projections 304 and the connector port 308 may be located centrally within the perimeter of the projections 304. It should be noted that the connector port 308 may be similar to the connector ports 308 described above with respect to the top attachment interface 126 and the side attachment interfaces 130. For example, the connector port 308 of the bottom attachment interface 234 may be configured to receive a USB-C connector of an attachment.

The connector port 308 may be located anywhere along the bottom attachment surface 236. For example, the bottom attachment surface 236 may define a recess 310 similar to the recess 310 of the top attachment interface 126, whereby the connector port 308 may be located within the recess 310 of the bottom attachment surface 236. Thus, an attachment may be in electrical communication with the UAV 100 and may be powered by a power source of the UAV 100, such as the battery 104.

Figure 5:
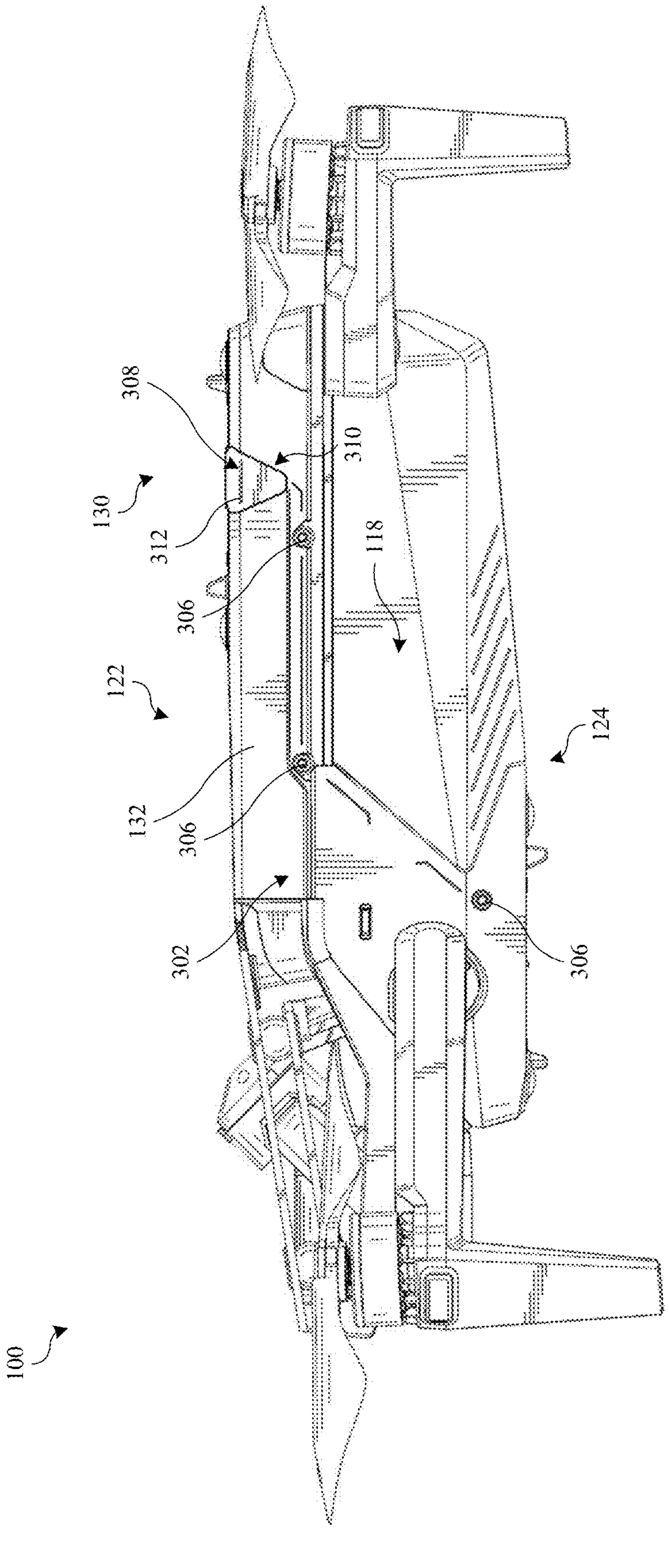
FIG. 5 is a side view of the UAV of FIG. 1

FIG. 5 illustrates a side view of the UAV 100 to further illustrate the side attachment interface 130 located on the first side 118 of the UAV 100. As described above, the side attachment interface 130 of the first side 118 may include the side attachment surface 132. The side attachment surface 132 may be coupled to, or formed with, a portion of the housing 302 that is located on the first side 118 of the UAV 100.

The side attachment interface 130 of the first side 118 may also include the mounting holes 306 located along the side attachment surface 132. The mounting holes 306 may be located anywhere along the side attachment surface 132 to removably couple attachments, such as the attachment 320 described above, to the first side 118. The side attachment interface 130 of the first side 118 may also include the connector port 308 to electrically couple attachments to the UAV 100. The connector port 308 may be located in the recess 310, whereby the recess 310 may be defined by the top attachment surface 128 and/or the side attachment surface 132 of the first side 118 (see FIGS. 3A and 3B). Based on the above configuration, an attachment, such as the attachment 320, may be coupled to the first side 118 of the UAV 100 and be free of obstruction of operation of the UAV 100 (e.g., the propulsion mechanisms 102 and/or the camera system 106 of the UAV 100).

Figure 6:
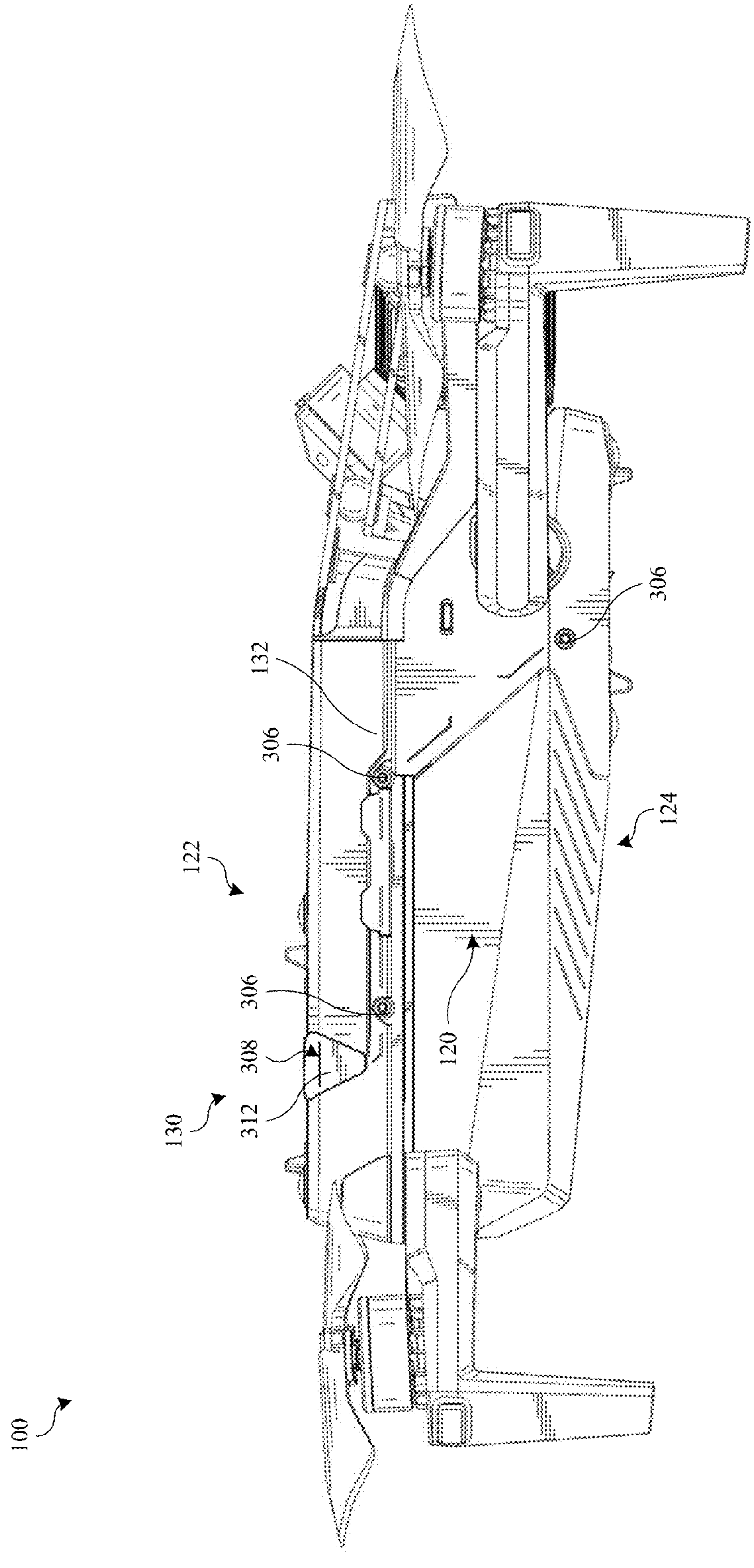
FIG. 6 is another side view of the UAV of FIG. 1.

FIG. 6 illustrates a side view of the UAV 100 to further illustrate the side attachment interface 130 located on the second side 120 of the UAV 100. As described above, the side attachment interface 130 of the second side 120 may include the side attachment surface 132. The side attachment surface 132 may be coupled to, or formed with, a portion of the housing 302 that is located on the second side 120 of the UAV 100. The side attachment interface 130 located on the second side 120 may directly oppose the side attachment interface 130 located on the first side 118. That is, the side attachment interface 130 located on the second side 120 may be symmetrically opposite to the side attachment interface 130 located on the first side 118 or may differ in configuration.

The side attachment interface 130 of the second side 120 may also include the mounting holes 306 located along the side attachment surface 132. The mounting holes 306 may be located anywhere along the side attachment surface 132 to removably couple attachments, such as the attachment 320 described above, to the second side 120. The side attachment interface 130 of the second side 120 may also include the connector port 308 to electrically couple attachments to the UAV 100. The connector port 308 may be located in the recess 310, whereby the recess 310 may be defined by the top attachment surface 128 and/or the side attachment surface 132 of the second side 120. Based on the above configuration, an attachment, such as the attachment 320, may be coupled to the second side 120 of the UAV 100 and be free of obstruction of operation of the UAV 100 (e.g., the propulsion mechanisms 102 and/or the camera system 106 of the UAV 100).

The following paragraphs describe a mechanically sealed LED assembly designed for improved ingress protection.

The LED assembly may be arranged in a night flight module that can be removably attached to the UAV 100.

Figure 7:
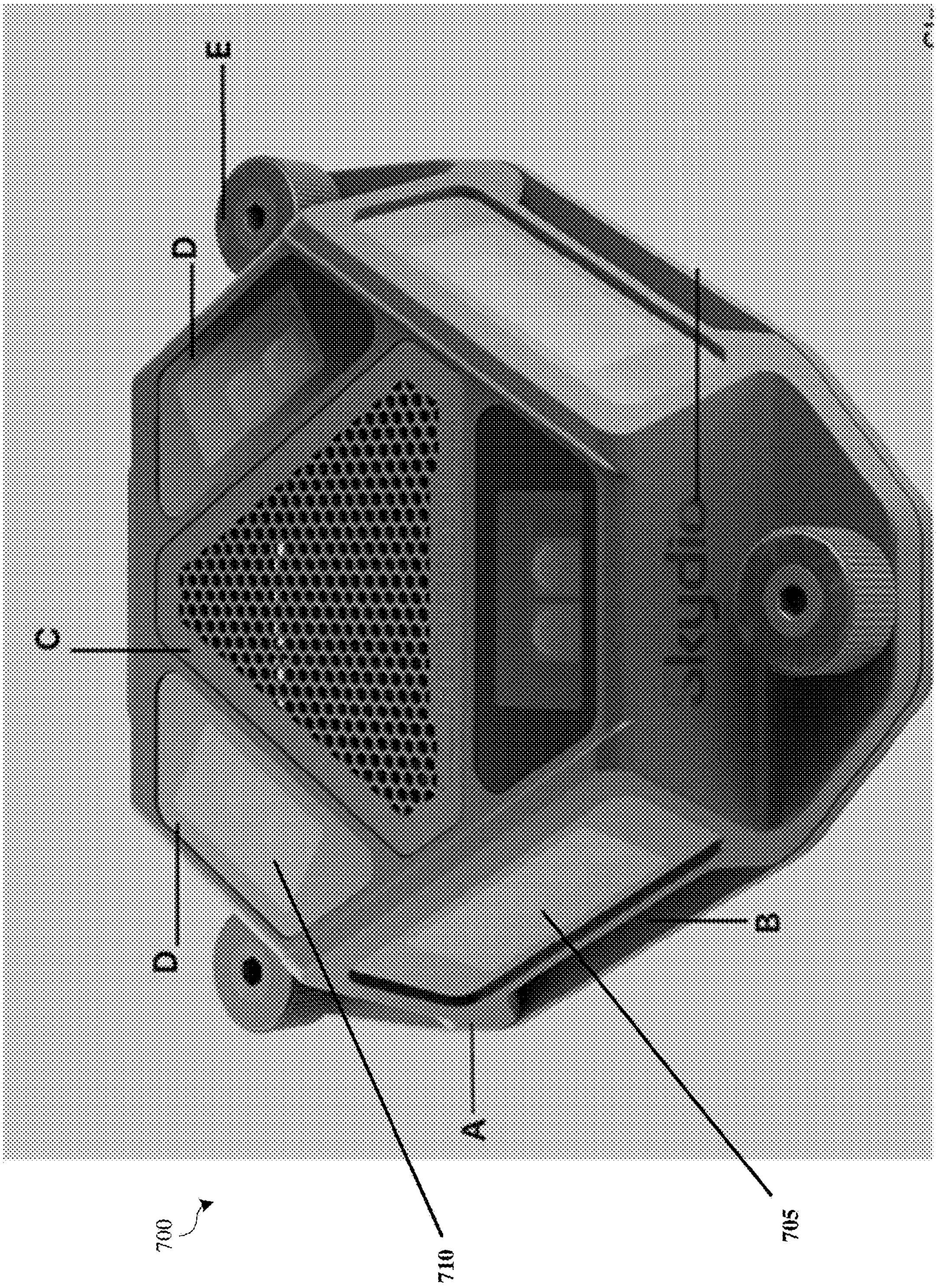
FIG. 7 illustrates a UAV night flight module with a mechanically sealed LED assembly designed for improved ingress protection is illustrated, consistent with various embodiments.

FIG. 7 illustrates a UAV night flight module 700 with a mechanically sealed LED assembly designed for improved ingress protection is illustrated, consistent with various embodiments. The night flight module 700 includes multiple LED cavities that each house an LED assembly. For example, the night flight module 700 includes multiple LED cavities in the side of the night flight module, such as a side LED cavity 705, and includes multiple LED cavities on the top of the night flight module, such as a top LED cavity 710. Each of these LED cavities are configured to prevent dust or water ingress, thereby forming dry zones around the LEDs and enabling flight in varied environmental conditions without risk of damage to the LEDs. The night flight module 700 features multiple labeled components: A, B, C, D, E, and F.

Label A may represent a housing or an enclosure of the night flight module 700. The house may be made of various materials, such as reinforced plastic. For example, the housing may be made using black plastic 15% glass fill polycarbonate (PC) VDI 27. In some embodiments, the material for the housing is chosen such that it provides a durable, impact-resistant, and visually consistent enclosure, suitable for UAV operation in rugged conditions.

Label B represents a structural element or a thermally conductive element (e.g., a heatsink or baffle) to manage heat from the LED assembly. In some embodiments, the element is aluminum (e.g., aluminum alloy 6061).

Label C represents a mesh that is configured to provide ventilation for cooling or heat dissipation for the heat generated from the LEDs. In some embodiments, the mesh can be an electroplated steel mesh.

Label D represents a cover glass, which is a high-transmission optical-grade clear glass that is configured to enhance (e.g., maximize) the optical output from the LEDs. In some embodiments, the cover glass may be printed or coated with a black mask around the edge to block stray or peripheral light to reduce glare or reflections interfering with one or more cameras or sensors of the UAV. The cover glass covers and protects LEDs from environmental ingress while enhancing (e.g., maximizing) forward light output and preventing reflections or glare into cameras or sensors of the UAV.

Label E represents a fastener that may be used to removably attach the night flight module 700 to the UAV. For example, the fastener may be a thumbscrew that enables manual attachment or detachment of the night flight module 700 to or from the UAV 100. In some embodiments, the night flight module 700 may be secured to the UAV 100 via the top attachment interface 126. The UAV 100 may accommodate multiple night flight modules 700. For example, a first night flight module may be mounted on the top attachment interface 126, while a second night flight module may be mounted on the bottom attachment interface 234.

Figure 8:
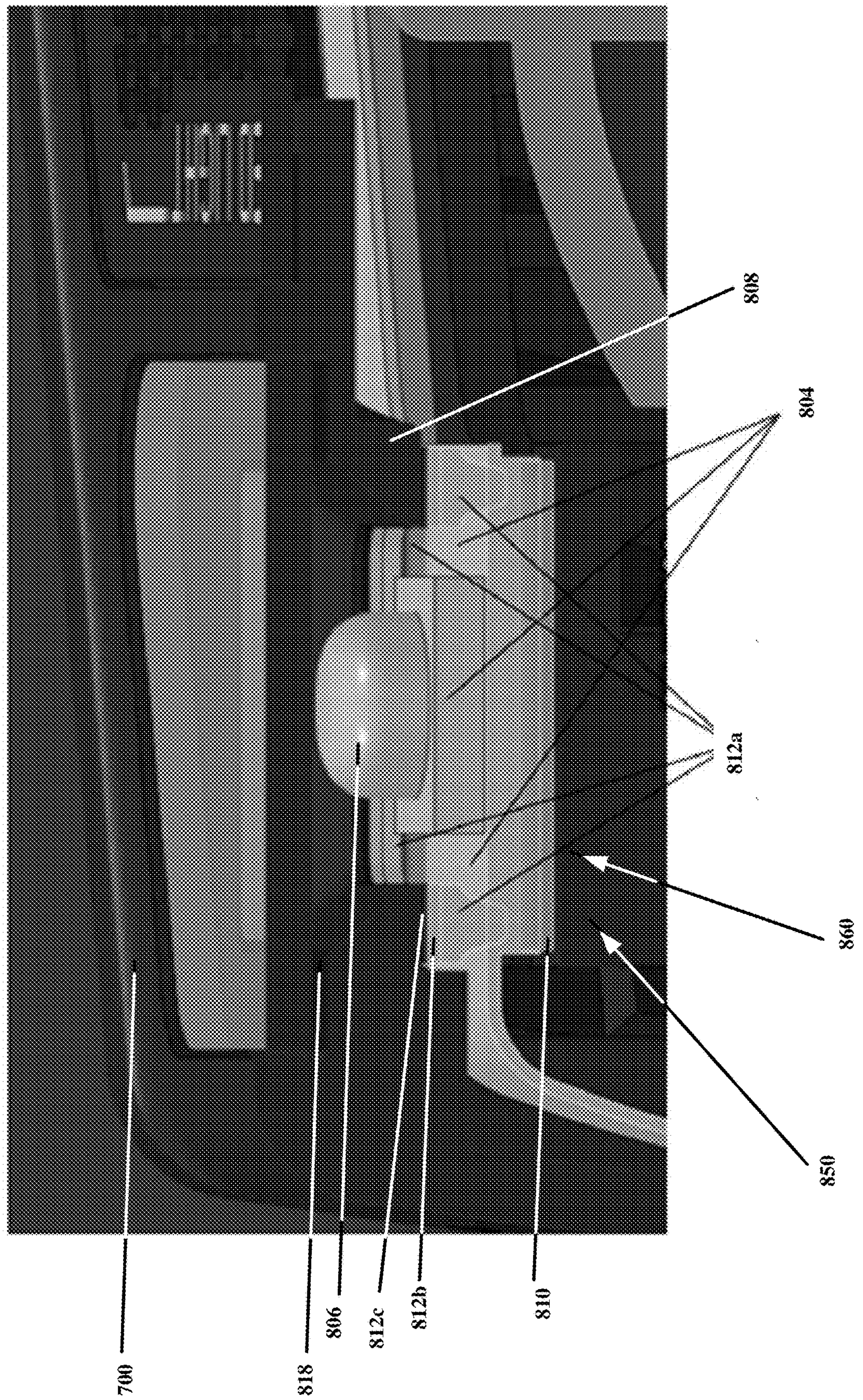
FIG. 8 illustrates a cross-sectional view of a multi-layer ingress protection stack of an LED assembly in a UAV night flight module, consistent with various embodiments.

FIG. 8 illustrates a cross-sectional view of a multi-layer ingress protection stack 860 of an LED assembly 850 in a UAV night flight module 700, consistent with various embodiments. This figure illustrates a LED assembly 850 in a mechanically sealed top LED cavity of the night flight module 700. The mechanically sealed LED assembly 850 is configured to prevent dust and water ingress, thereby ensuring the LEDs' functionality in various environmental conditions. The LED base layer 804 of this assembly is the FPCA, which serves as the foundation for the placement of LEDs such as an LED 806. The FPCA is integral to the assembly, providing structural support and facilitating electrical connections for the LEDs.

Above the LED base layer 804, a compressible rubber seal 812*a* of a seal component assembly is prominently featured, providing a compressible barrier that effectively prevents environmental contaminants from reaching the LEDs. This seal is part of a complex seal components assembly 812, which includes a stainless steel stiffener 812*b* and an adhesive layer 812*c*, ensuring a robust and reliable seal. The compressible nature of the rubber seal allows it to adapt to various pressures, maintaining a tight seal under different conditions.

An aluminum baffle 808, shown above the seal components assembly (e.g., above 812) is mechanically secured (e.g., screwed) through the LED base layer 804 to a heat-dissipating component 810 (e.g., heatsink), to establish a thermal contact between the LED base layer 804 and the heat-dissipating component 810 for thermal conduction. This configuration not only aids in heat dissipation but also compresses the seal components assembly against the LED base layer 804, enhancing the overall ingress protection. The final layer in this stack is the cover glass (not illustrated), which is bonded to the baffle 808 using an adhesive layer 818. This cover glass serves as the exterior layer, providing an additional barrier against environmental elements while allowing optical power output from the LEDs.

The interaction between these components is essential for the assembly's functionality. The LED base layer 804, seal components assembly 812, aluminum baffle 808, and cover glass work together to create a sealed environment for the LEDs, ensuring they remain protected from dust and water. This design allows the UAV night flight module 700 to operate in varied environmental conditions without risking damage to the LEDs, thereby maintaining high optical output and reliability. The cross-section in FIG. 8 effectively demonstrates how each layer contributes to the overall ingress protection strategy, highlighting the innovative approach taken to safeguard the LEDs in demanding applications.

Figure 9:
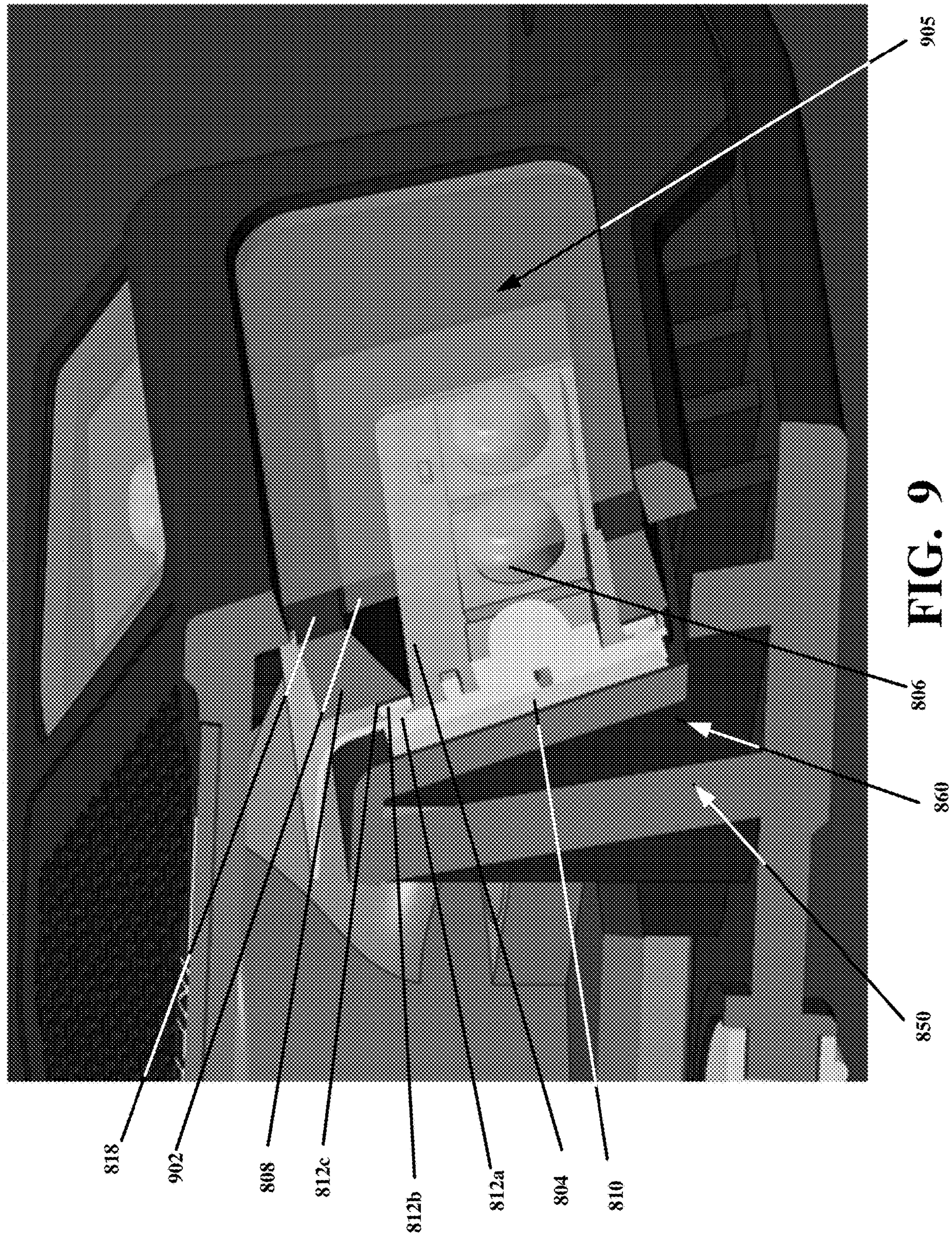
FIG. 9 illustrates a cross-sectional view of a mechanically sealed LED assembly designed for improved ingress protection in a UAV night flight module, consistent with various embodiments.

FIG. 9 illustrates a cross-sectional view of a mechanically sealed LED assembly 850 designed for improved ingress protection in a UAV night flight module, consistent with various embodiments. This assembly is meticulously constructed in a side LED cavity 905 of the night flight module 700 that is mechanically sealed to ensure that the LEDs 806 are safeguarded against environmental elements such as dust and water, while also maintaining optical power output. The assembly 850 comprises several integral layers, each contributing to the overall ingress protection and functionality of the module.

As described above, the LEDs, such as LED 806, is mounted on the LED base layer 804. The LED base layer 804 serves as the base layer of the ingress protection stack 860, providing a stable platform for the LEDs and facilitating electrical connections. Above the LED base layer 804 is the seal components assembly 812, which ensures protection against environmental ingress. This seal components assembly 812 is composed of a compressible rubber seal 812*a* (e.g., silicone), a stainless steel stiffener 812*b*, and an adhesive layer 812*c*. The seal is designed to compress against the FPCA, creating a tight barrier that prevents dust and water from reaching the LEDs.

A baffle 808 is positioned above the seal components assembly 812. This baffle 808 is mechanically secured (e.g., screwed) through the LED base layer 804 to the heat-dissipating component 810, such as a heatsink, ensuring that the LED base layer 804 maintains thermal contact with the heat-dissipating component 810 for thermal conduction. The heat-dissipating component 810 aids in dissipating heat generated by the LEDs, thereby enhancing the longevity and performance of the LED assembly. When the baffle 808 is mechanically secured, the baffle 808 compresses the seal components assembly against the LED base layer 804, forming a robust seal that effectively isolates the LEDs from external conditions. The baffle 808 may be made using a thermally conductive material, such as aluminum. The final layer in this multi-layer ingress protection stack 860 is a cover glass 902, which is bonded to the baffle 808 using an adhesive layer 818. This cover glass not only completes the ingress protection stack 860 but also serves as a protective barrier against physical impacts and environmental exposure.

The structural relationships among these components are designed to ensure that each layer contributes to the overall ingress protection and thermal management of the LED assembly 850. The cover glass 902 and compression of the seal components assembly 812 by the baffle 808 creates a robust seal that effectively isolates the LEDs from external conditions. This design allows the UAV night flight module 700 to operate in diverse environmental conditions without risking damage to the LEDs, thereby ensuring reliable performance and high optical output.

Figure 10:
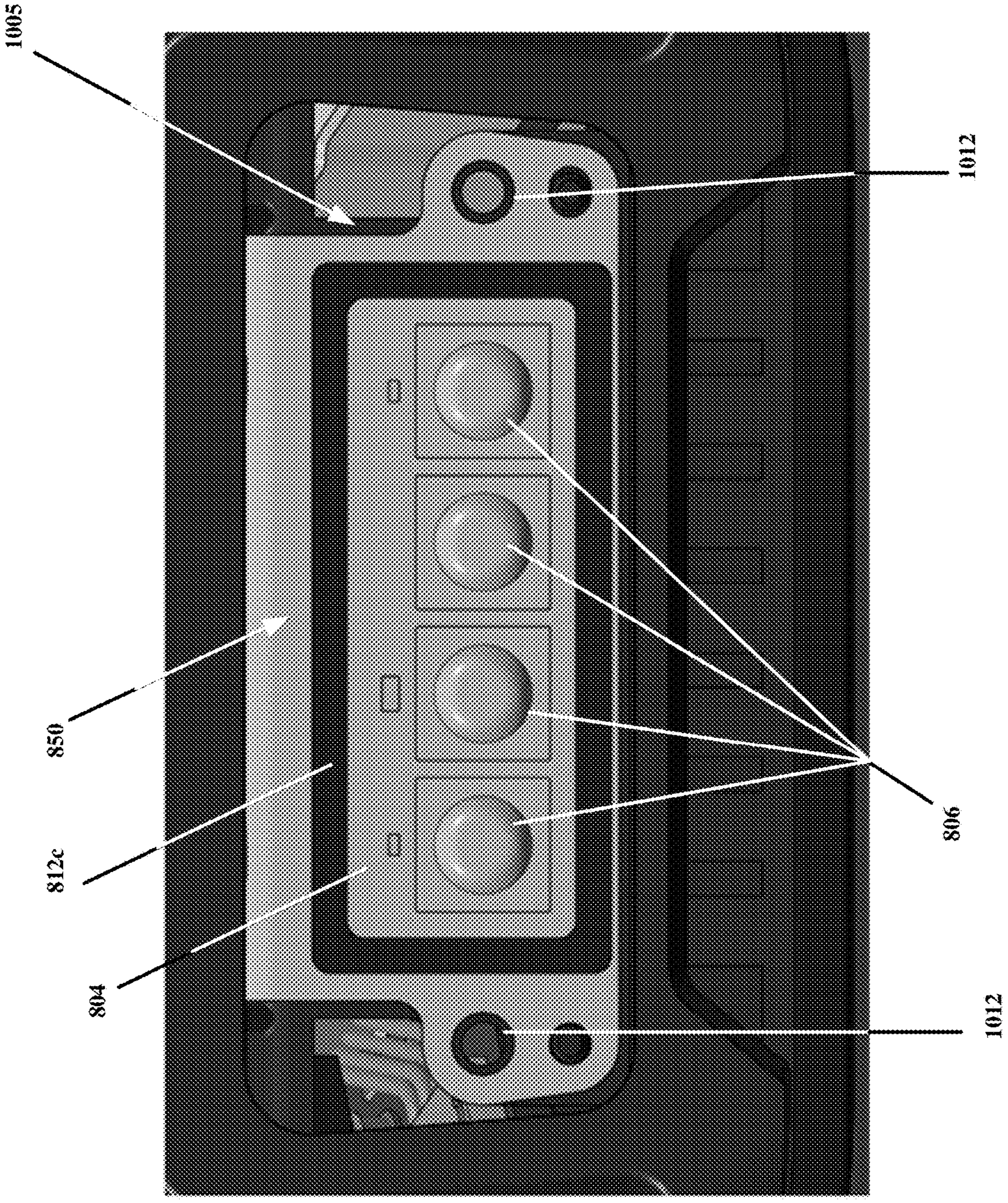
FIG. 10 illustrates front perspective of a mechanically sealed LED assembly within a side LED cavity of a UAV night flight module with baffles removed, consistent with various embodiments.

FIG. 10 illustrates front perspective of a mechanically sealed LED assembly 850 within a side LED cavity of a UAV night flight module 700 with baffles removed, consistent with various embodiments. The LED assembly 850 in this figure is housed in a mechanically sealed side LED cavity 1005 of the night flight module 700. The LED cavity 1005 is configured to house the LEDs 806 and are specifically designed to create dry zones, thereby safeguarding the LEDs from potential environmental damage. In this front perspective, the cover glass of the ingress protection stack and the side baffle are removed to reveal the arrangement of the seal components assembly 812 relative to the LED base layer 804. The seal components assembly 812 is above the LED base layer 804 and is in contact with the LED base layer 804. In some embodiments, the top most layer of the seal components assembly 812, which is an adhesive layer 812*c*, is revealed in the front perspective, as illustrated in FIG. 10.

The screw holes 1012 are strategically placed to secure the entire assembly, ensuring that each layer is tightly compressed and aligned. This configuration not only protects the LEDs but also facilitates efficient thermal management, which is vital for maintaining the performance and longevity of the LEDs during night flights. When the LED assembly 850 is covered with the cover glass, the cover glass serves as a protective barrier against physical impacts and environmental exposure. The integration of these components within the UAV night flight module 700 exemplifies a sophisticated approach to achieving ingress protection while maximizing the optical output of the LEDs.

Figure 11:
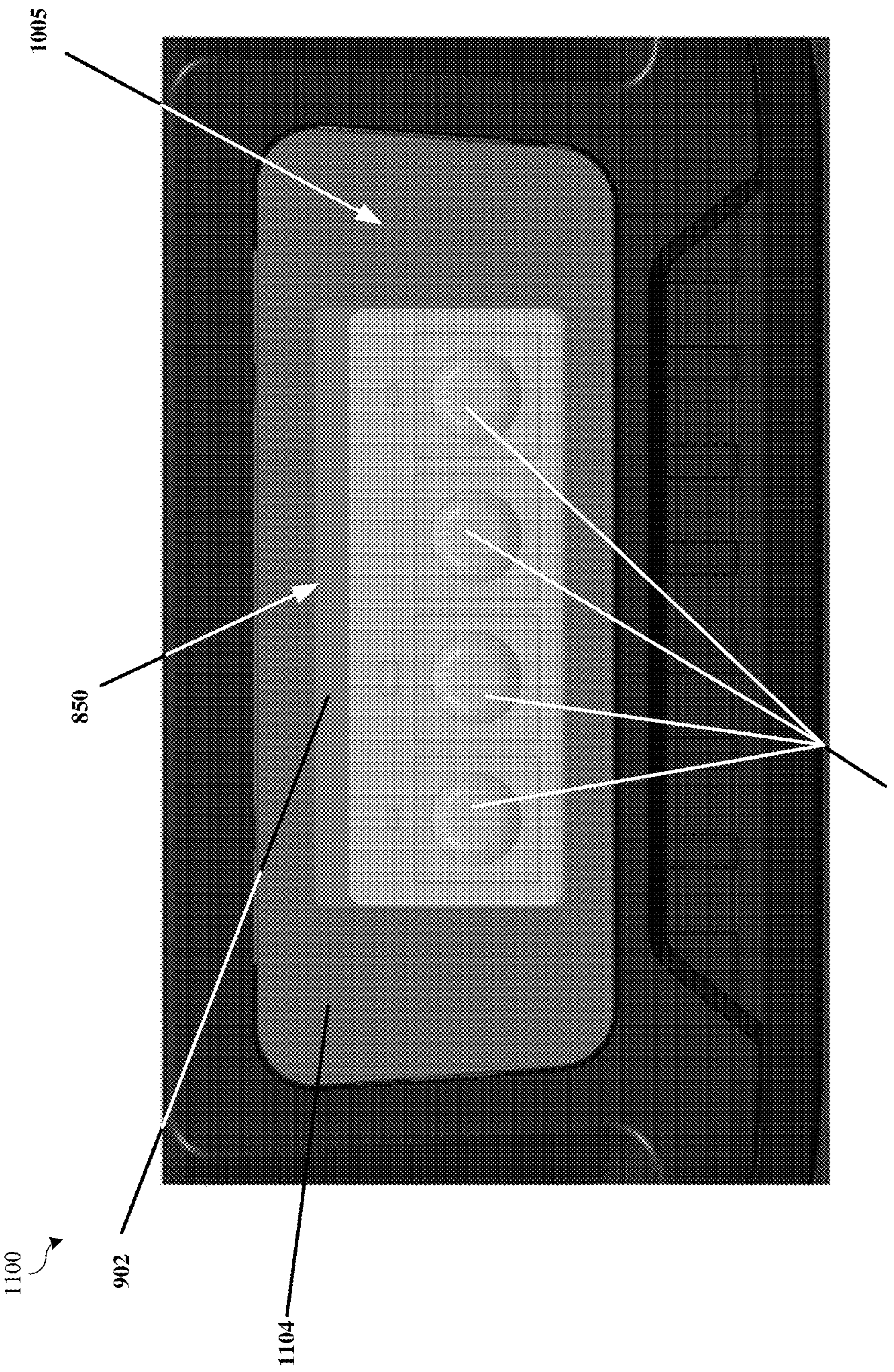
FIG. 11 illustrates a perspective of a mechanically sealed LED assembly in a UAV night flight module, consistent with various embodiments.
Figure 12:
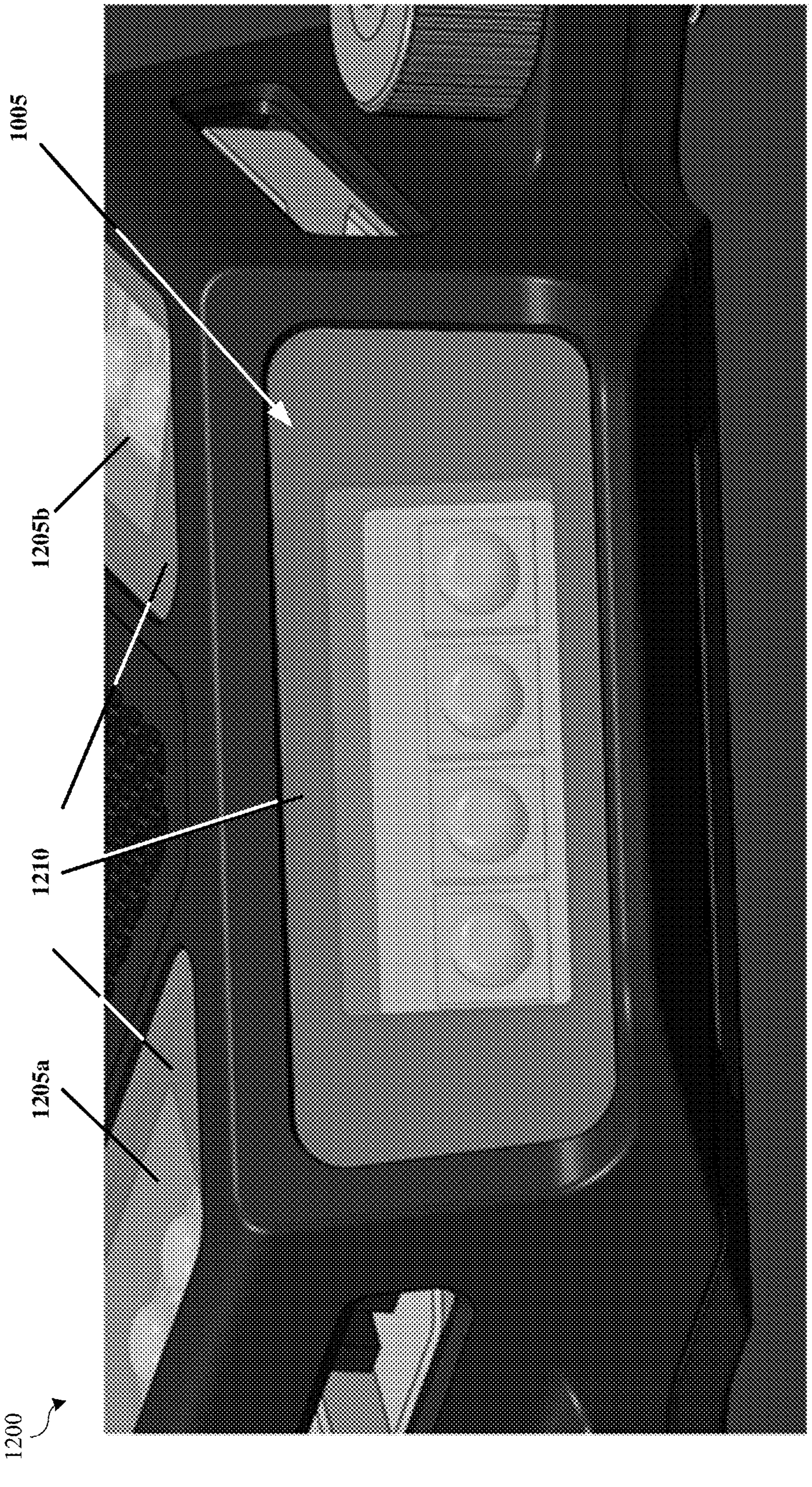
FIG. 12 illustrates another perspective of a mechanically sealed LED assembly in a UAV night flight module, consistent with various embodiments.

FIGS. 11 and 12 illustrate different perspectives of a mechanically sealed LED assembly 850 in a UAV night flight module 700, consistent with various embodiments. In some embodiments, the perspective 1100 of FIG. 11 illustrates the LED assembly as seen in a manufactured night flight module 700. As can be seen, the LED assembly 850 is housed in a mechanically sealed LED cavity 1005. The LEDs 806 are protected by a cover glass 902, which serves as the exterior layer of the ingress protection stack. The cover glass 902 is essential for shielding the LEDs 806 from environmental elements such as dust and water, ensuring the assembly's durability and functionality in various conditions. In some embodiments, the housing of the night flight module 700 includes an optical-grade glass element 1104 (e.g., also Label D in FIG. 7) covering the LED cavity 1005. The optical-grade glass enhances the optical output of the LEDs, and a black mask coating on the glass element 1104 and also acts as an optical seal by blocking peripheral or stray light, thereby reducing interference with the cameras or sensors of the UAV 100. In some embodiments, the glass element 1104 may itself be the cover glass 902 of the ingress protection stack.

In some embodiments, the perspective 1200 of FIG. 12 illustrates the LED assemblies in multiple sealed LED cavities as seen in a manufactured night flight module 700. For example, the perspective 1200 illustrates the LED assemblies housed in top LED cavities 1205*a* and 1205*b* and in side LED cavity 1005. The perspective 1200 also illustrates the adhesive layer 1210 of a seal component assembly in the LED cavities.

Figure 13:
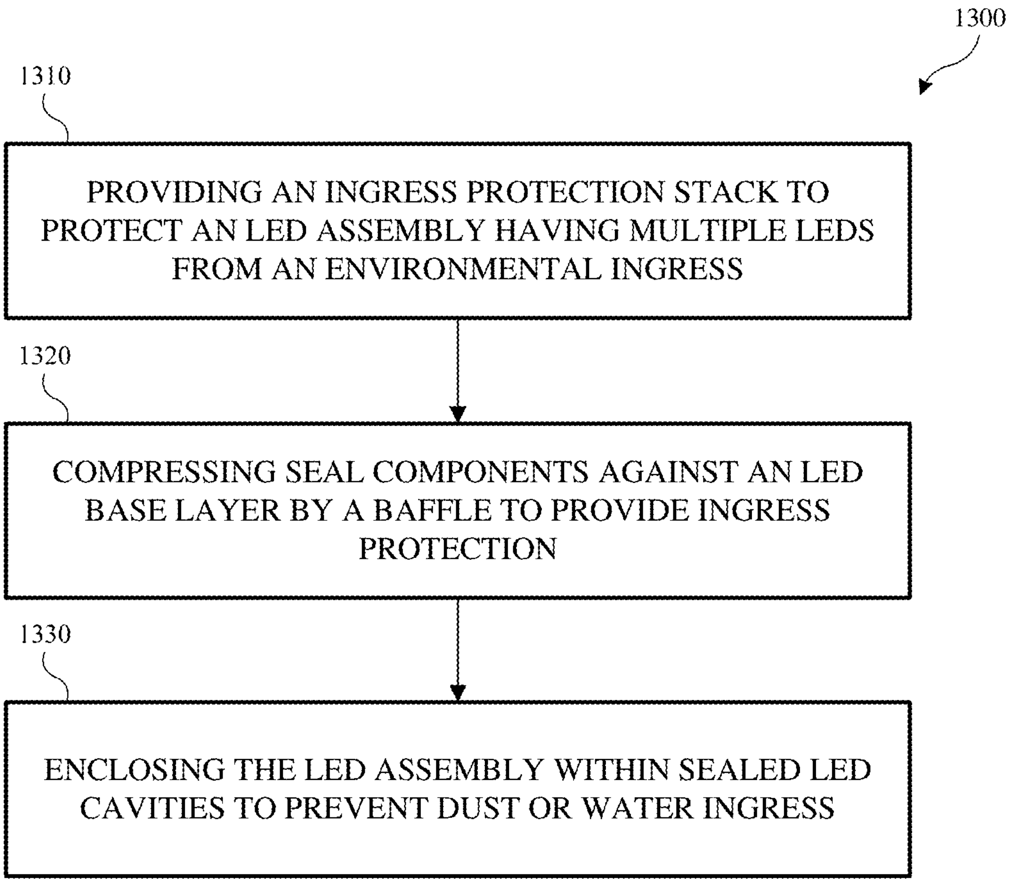
FIG. 13 is a flowchart of a method for providing improved ingress protection for an LED assembly in a UAV night flight module, consistent with various embodiments.

FIG. 13 is a flowchart of a method 1300 for providing improved ingress protection for an LED assembly in a UAV night flight module, consistent with various embodiments. In some embodiments, the method 1300 may be implemented to build an LED assembly in a night flight module attachment of an UAV. In the context of arranging the LED assembly on the UAV night flight module, as described above at least with reference to FIGS. 7-12, the LED assembly may be integrated with the UAV night flight module to ensure that the LEDs are effectively utilized for night operations. The LED assembly, which may include a plurality of LEDs, can be arranged on the UAV night flight module to facilitate night-time visibility and operational efficiency. This arrangement may involve the strategic placement of the LED assembly to optimize the illumination provided by the LEDs, thereby enhancing the UAV's capability to operate in low-light conditions. The integration of the LED assembly with the UAV night flight module may also involve considerations for the mechanical and electrical connections required to support the functionality of the LEDs. The LED assembly may be designed to withstand various environmental conditions, ensuring that the LEDs remain operational and protected from potential damage due to dust or water ingress. This arrangement may contribute to the overall performance and reliability of the UAV during night flights, allowing it to navigate and perform tasks effectively in diverse environmental settings.

At block 1310, the process may involve providing an ingress protection stack 860 that comprises a variety of components to ensure the protection of an LED assembly 850 having multiple LEDs such as LED 806. This ingress protection stack may include an LED base layer 804, seal components assembly 812, a baffle 808, and a cover glass 902. The LED base layer 804 may serve as the foundational component upon which other elements are assembled. The seal components assembly 812, which may include a compressible rubber seal 812*a*, a stainless steel stiffener 812*b*, and an adhesive layer 812*c*, can be designed to enhance the sealing capability of the stack. The baffle 808, made of thermally conductive material, such as aluminum, may be utilized to compress the seal components against the LED base layer 804, thereby ensuring a secure fit. The cover glass 902, which may be bonded to the baffle 808 using an adhesive layer 818, can serve as the exterior layer of the ingress protection stack. The cover glass 902 may also be an optical-grade glass that enhances the optical power output of the LEDs, while the black mask coating on the cover glass 902 may act as an optical seal by blocking the peripheral light.

The LED base layer 804 may be provided as a foundational component of the ingress protection stack 860, while the cover glass 902 may serve as the exterior layer. This configuration may be integral to the multi-layer stack design, which ensures ingress protection for the LED assembly 850. The LED base layer 804 may be positioned to support the other components of the stack, including the seal components assembly 812, baffle 808, and the cover glass 902. The cover glass 902, as the exterior layer, may be designed to shield the internal components from environmental factors such as dust and water. This arrangement may facilitate the creation of a barrier, which may be essential for maintaining the integrity and functionality of the LED assembly in various environmental conditions.

At block 1320, the process may involve compressing the seal components assembly 812 against the LED base layer 804 by utilizing the baffle 808 to enhance ingress protection. The seal components assembly, which may include a compressible rubber seal 812*a*, a stainless steel stiffener 812*b*, and an adhesive layer 812*c*, can be compressed to form a tight seal. This compression may be facilitated by mechanically securing the baffle (e.g., screwing) through the LED base layer 804 to the heat-dissipating component 810, ensuring that the LED base layer 804 establishes contact with the heat-dissipating component 810 for thermal conduction. The various components of the seal components assembly 812 are designed to enhance the sealing capability of the LED assembly. The compressible rubber seal 812*a* may serve as a flexible barrier that can adapt to the contours of the assembly, potentially preventing the ingress of dust and water. The stainless steel stiffener 812*b* may provide structural support to the seal, ensuring that it maintains its shape and effectiveness under various conditions. The adhesive layer 812*c* may facilitate the bonding of these components to the surrounding structure (e.g., to baffle), ensuring that the seal remains intact and effective.

The baffle, potentially made of aluminum, may be designed to compress the seal against the LED base layer, thereby facilitating the transfer of heat away from the LEDs. This setup can help in maintaining the operational efficiency of the LEDs by preventing overheating, which may otherwise compromise their performance. The heatsink, in this configuration, may serve as a component in dissipating heat, thereby enhancing the longevity and reliability of the LED assembly. The integration of these components may be aimed at ensuring that the LED assembly can function optimally in various environmental conditions. The use of an aluminum baffle may be particularly advantageous due to its lightweight and thermal conductive properties, which can contribute to the overall effectiveness of the thermal management system within the UAV night flight module.

The aluminum baffle 808 can serve as a component in ensuring the structural integrity and protection of the LED assembly 850. The baffle 808 may be designed to compress the seal components against the LED base layer 804, thereby enhancing the ingress protection by preventing dust and water from entering the LED cavities. The aluminum material of the baffle may be chosen for its durability and ability to withstand environmental stresses, contributing to the overall robustness of the ingress protection stack 860.

The multi-layer stack design, which includes the LED base layer, seal components, baffle, and cover glass, may aid in maintaining the integrity and functionality of the LED assembly in various environmental conditions. This setup may allow the UAV night flight module to operate effectively without risking damage to the LEDs, thus enhancing the overall performance and reliability of the system.

At block 1330, the process may involve enclosing the plurality of LEDs within sealed LED cavities. This action may be intended to ensure the optical power output of the LEDs. The LED cavities may be configured to create dry zones, which can prevent dust or water ingress, thereby allowing the LEDs to function optimally in various environmental conditions. The sealing process may involve the use of a multi-layer stack, which may include components such as a silicone rubber compressible seal, a stainless steel stiffener, and an adhesive layer. These components may work together to provide ingress protection by forming a barrier against environmental elements. The aluminum baffle may be screwed through the LED base layer to a heatsink, which may ensure thermal conduction and further enhance the protection of the LEDs.

The sealing process also includes bonding of the cover glass 902 to the baffle 808 using the adhesive layer 818. The adhesive layer 818 may serve as a component in securing the cover glass 902, ensuring that it remains firmly attached to the baffle. This bonding of the cover glass 902 to the baffle 808 creates a cavity (referred to as LED cavity) around the LEDs that is sealed for any environmental ingress. The bonding may be essential for maintaining the integrity of the ingress protection stack, as it may prevent the ingress of dust and water into the LED assembly. The cover glass 902, being the exterior layer, may provide a protective barrier, while the baffle 808 may offer structural support. The adhesive layer 818 may facilitate a strong bond between these two components, contributing to the overall ingress protection of the LED assembly. The bonding process may also play a role in maintaining the optical power output of the LEDs by ensuring that the cover glass 902 remains in the correct position, allowing for optimal light transmission.

Thus, a method of making an LED assembly with the above configuration may help in providing improved ingress protection for an LED assembly in a UAV night flight module, thereby enabling flight operation of the UAV in various environmental conditions without risking any damage to the LEDs.

Figure 14:
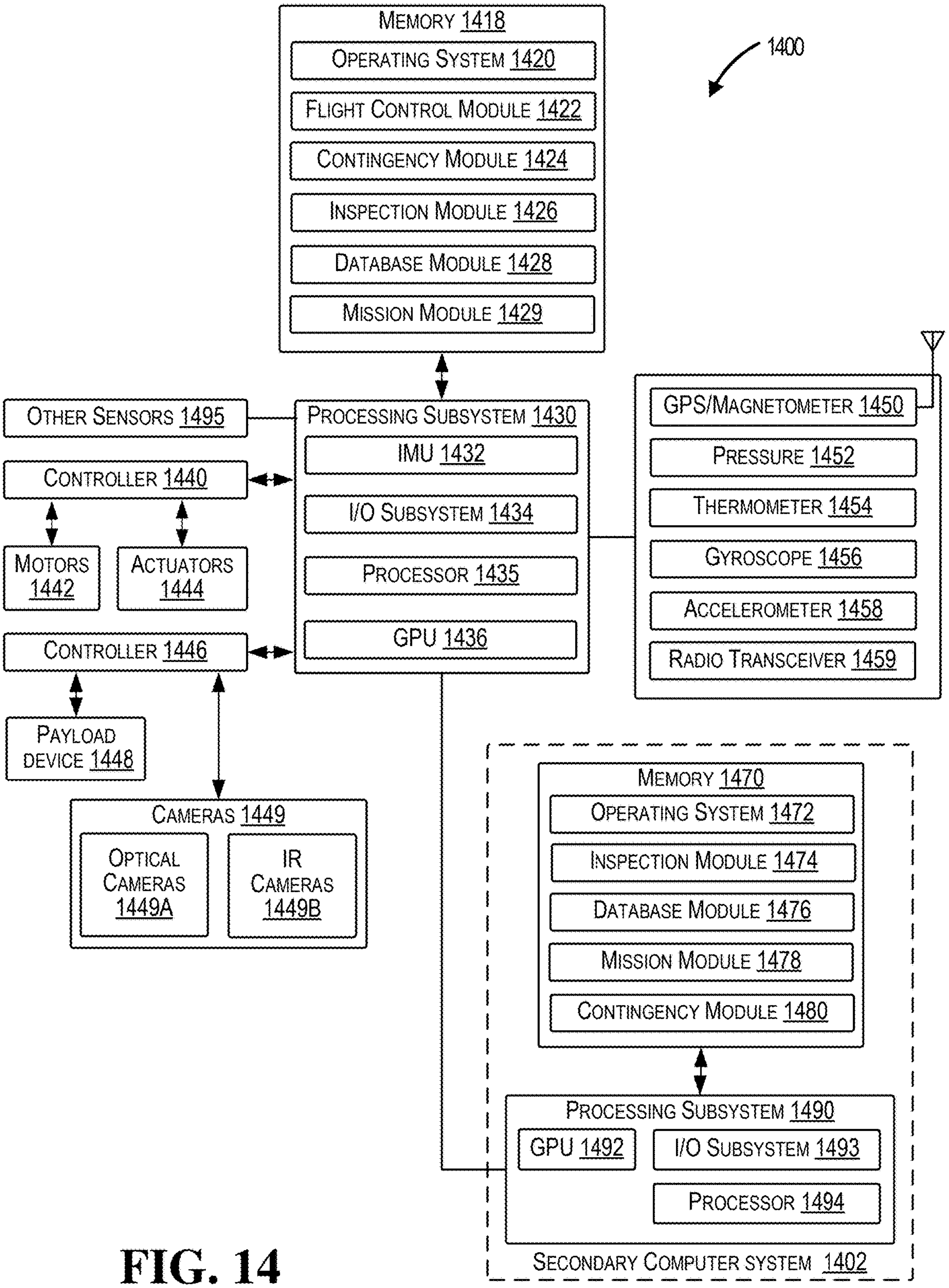
FIG. 14 illustrates an example UAV architecture for a UAV, consistent with various embodiments.

FIG. 14 illustrates an example UAV architecture for a UAV, consistent with various embodiments. A UAV can include a primary computer system 1400 and a secondary computer system 1402. The UAV primary computer system 1400 can be a system of one or more computers, or software executing on a system of one or more computers, which is in communication with, or maintains, one or more databases. The UAV primary computer system 1400 can include a processing subsystem 1430 including one or more processors 1435, graphics processing units 1436, I/O subsystem 1434, and an inertial measurement unit (IMU) 1432. In addition, the UAV primary computer system 1400 can include logic circuits, analog circuits, associated volatile and/or non-volatile memory, associated input/output data ports, power ports, etc., and include one or more software processes executing on one or more processors or computers. The UAV primary computer system 1400 can include memory 1418.

Memory 1418 may include non-volatile memory, such as one or more magnetic disk storage devices, solid-state hard drives, or flash memory. Other volatile memory such as RAM, DRAM, SRAM may be used for temporary storage of data while the UAV is operational. Databases may store information describing UAV flight operations, flight plans, contingency events, geofence information, component information and other information.

The UAV primary computer system 1400 may be coupled to one or more sensors, such as global navigation satellite system (GNSS) receivers 1450 (e.g., GPS receivers), thermometer 1454, gyroscopes 1456, accelerometers 1458, pressure sensors (static or differential) 1452, and other sensors 1495 that capture perception inputs of a physical environment. The other sensors 1495 can include current sensors, voltage sensors, magnetometers, hydrometers, anemometers and motor sensors. The UAV may use IMU 1432 in inertial navigation of the UAV. Sensors can be coupled to the UAV primary computer system 1400, or to controller boards coupled to the UAV primary computer system 1400. One or more communication buses, such as a controller area network (CAN) bus, or signal lines, may couple the various sensor and components.

Various sensors, devices, firmware and other systems may be interconnected to support multiple functions and operations of the UAV. For example, the UAV primary computer system 1400 may use various sensors to determine the UAV's current geo-spatial position, attitude, altitude, velocity, direction, pitch, roll, yaw and/or airspeed and to pilot the UAV along a specified flight path and/or to a specified location and/or to control the UAV's attitude, velocity, altitude, and/or airspeed (optionally even when not navigating the UAV along a specific flight path or to a specific location).

The flight control module 1422 handles flight control operations of the UAV. The module interacts with one or more controllers 1440 that control operation of motors 1442 and/or actuators 1444. For example, the motors may be used for rotation of propellers, and the actuators may be used for flight surface control such as ailerons, rudders, flaps, landing gear and parachute deployment.

The contingency module 1424 monitors and handles contingency events. For example, the contingency module 1424 may detect that the UAV has crossed a boundary of a geofence, and then instruct the flight control module 1422 to return to a predetermined landing location. The contingency module 1424 may detect that the UAV has flown or is flying out of a visual line of sight (VLOS) from a ground operator, and instruct the flight control module 1422 to perform a contingency action, e.g., to land at a landing location. Other contingency criteria may be the detection of a low battery or fuel state, a malfunction of an onboard sensor or motor, or a deviation from the flight plan. The foregoing is not meant to be limiting, as other contingency events may be detected. In some instances, if equipped on the UAV, a parachute may be deployed if the motors or actuators fail.

The mission module 1429 processes the flight plan, waypoints, and other associated information with the flight plan as provided to the UAV in a flight package. The mission module 1429 works in conjunction with the flight control module 1422. For example, the mission module may send information concerning the flight plan to the flight control module 1422, for example waypoints (e.g., latitude, longitude and altitude), flight velocity, so that the flight control module 1422 can autopilot the UAV.

The UAV may have various devices connected to the UAV for performing a variety of tasks, such as data collection. For example, the UAV may carry one or more cameras 1449. Cameras 1449 can include one or more visible light cameras 1449A, which can be, for example, a still image camera, a video camera, or a multispectral camera. The UAV may carry one or more infrared cameras 1449B. Each infrared camera 1449B can include a thermal sensor configured to capture one or more still or motion thermal images of an object, e.g., a solar panel. In addition, the UAV may carry a Lidar, radio transceiver, sonar, and traffic collision avoidance system (TCAS). Data collected by the devices may be stored on the device collecting the data, or the data may be stored on non-volatile memory 1418 of the UAV primary computer system 1400.

The UAV primary computer system 1400 may be coupled to various radios, e.g., transceivers 1459 for manual control of the UAV, and for wireless or wired data transmission to and from the UAV primary computer system 1400, and optionally a UAV secondary computer system 1402. The UAV may use one or more communications subsystems, such as a wireless communication or wired subsystem, to facilitate communication to and from the UAV. Wireless communication subsystems may include radio transceivers, infrared, optical ultrasonic and electromagnetic devices. Wired communication systems may include ports such as Ethernet ports, USB ports, serial ports, or other types of port to establish a wired connection to the UAV with other devices, such as a ground control station (GCS), flight planning system (FPS), or other devices, for example a mobile phone, tablet, personal computer, display monitor, other network-enabled devices. The UAV may use a lightweight tethered wire to a GCS for communication with the UAV. The tethered wire may be affixed to the UAV, for example via a magnetic coupler.

The UAV can generate flight data logs by reading various information from the UAV sensors and operating system 1420 and storing the information in computer-readable media (e.g., non-volatile memory 1418). The data logs may include a combination of various data, such as time, altitude, heading, ambient temperature, processor temperatures, pressure, battery level, fuel level, absolute or relative position, position coordinates (e.g., GPS coordinates), pitch, roll, yaw, ground speed, humidity level, velocity, acceleration, and contingency information. The foregoing is not meant to be limiting, and other data may be captured and stored in the flight data logs. The flight data logs may be stored on a removable medium. The medium can be installed on the ground control system or onboard the UAV. The data logs may be wirelessly transmitted to the ground control system or to the FPS.

Modules, programs or instructions for performing flight operations, contingency maneuvers, and other functions may be performed with operating system 1420. In some implementations, the operating system 1420 can be a real time operating system (RTOS), UNIX, LINUX, OS X, WINDOWS, ANDROID or other operating system 1420. Additionally, other software modules and applications may run on the operating system 1420, such as a flight control module 1422, contingency module 1424, inspection module 1426, database module 1428 and mission module 1429. In particular, inspection module 1426 can include computer instructions that, when executed by processor 1435, can cause processor 1435 to control the UAV to perform solar panel inspection operations as described below. Typically, flight critical functions will be performed using the UAV primary computer system 1400. Operating system 1420 may include instructions for handling basic system services and for performing hardware dependent tasks.

In addition to the UAV primary computer system 1400, the secondary computer system 1402 may be used to run another operating system 1472 to perform other functions. The UAV secondary computer system 1402 can be a system of one or more computers, or software executing on a system of one or more computers, which is in communication with, or maintains, one or more databases. The UAV secondary computer system 1402 can include a processing subsystem 1490 of one or more processors 1494, GPU 1492, and I/O subsystem 1493. The UAV secondary computer system 1402 can include logic circuits, analog circuits, associated volatile and/or non-volatile memory, associated input/output data ports, power ports, etc., and include one or more software processes executing on one or more processors or computers. The UAV secondary computer system 1402 can include memory 1470. Memory 1470 may include non-volatile memory, such as one or more magnetic disk storage devices, solid-state hard drives, flash memory. Other volatile memory such a RAM, DRAM, SRAM may be used for storage of data while the UAV is operational.

Ideally, modules, applications and other functions running on the secondary computer system 1402 will be non-critical functions in nature. If the function fails, the UAV will still be able to operate safely. The UAV secondary computer system 1402 can include operating system 1472. In some implementations, the operating system 1472 can be based on real time operating system (RTOS), UNIX, LINUX, OS X, WINDOWS, ANDROID or other operating system.

Additionally, other software modules and applications may run on the operating system 1472, such as an inspection module 1474, database module 1476, mission module 1478 and contingency module 1480. In particular, inspection module 1474 can include computer instructions that, when executed by processor 1494, can cause processor 1494 to control the UAV to perform solar panel inspection operations as described below. Operating system 1472 may include instructions for handling basic system services and for performing hardware dependent tasks.

The UAV can include controllers 1446. Controllers 1446 may be used to interact with and operate a payload device 1448, and other devices such as cameras 1449A and 1449B. Cameras 1449A and 1449B can include a still-image camera, video camera, infrared camera, multispectral camera, stereo camera pair. In addition, controllers 1446 may interact with a Lidar, radio transceiver, sonar, laser ranger, altimeter, TCAS, ADS-B (Automatic dependent surveillance broadcast) transponder. Optionally, the secondary computer system 1402 may have controllers to control payload devices.

The UAV 100 illustrated in FIGS. 1-6 is an example provided for illustrative purposes. The UAV 100 in accordance with the present disclosure may include more or fewer components than are shown. For example, while a quadcopter is illustrated, the UAV 100 is not limited to any particular UAV configuration and may include hexacopters, octocopters, fixed wing aircraft, or any other type of independently maneuverable aircraft, as will be apparent to those of skill in the art having the benefit of the disclosure herein. Furthermore, the navigation of an autonomous UAV 100 may be guided by other types of vehicles (e.g., spacecraft, land vehicles, watercraft, submarine vehicles, etc.).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately) 225°). The term "generally parallel" should thus be understood as referring to encompass configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

As used herein, unless specifically stated otherwise, the term "or" encompasses all possible combinations, except where infeasible. For example, if it is stated that a component includes A or B, then, unless specifically stated otherwise or infeasible, the component may include only A, or only B, or A and B. As a second example, if it is stated that a component includes A, B, or C, then, unless specifically stated otherwise or infeasible, the component may include only A, or only B, or only C, or A and B, or A and C, or B and C, or A and B and C. Expressions such as "at least one of" do not necessarily modify an entirety of a following list and do not necessarily modify each member of the list, such that "at least one of A, B, and C" should be understood as including only A, or only B, or only C, or any combination of A, B, and C. The phrase "one of A and B" or "any one of A and B" shall be interpreted in the broadest sense to include one of A, or one of B.

The descriptions herein are intended to be illustrative, not limiting. Thus, it will be apparent to one skilled in the art that modifications may be made as described without departing from the scope of the claims set out below.

What is claimed is:

1. A mechanically sealed light emitting diode (LED) assembly with an improved ingress protection and for use in an unmanned aerial vehicle (UAV), the mechanically sealed LED assembly comprising:
- an LED assembly including:
  - multiple LEDs enclosed within sealed LED cavities configured to prevent dust or water ingress, thereby forming dry zones around the LEDs and enabling flight in varied environmental conditions without risk of damage to the LEDs; and
  - an ingress protection stack configured to provide ingress protection to the LED assembly, the ingress protection stack including:
    - an LED base layer,
    - seal components,
    - a baffle,
    - a heat-dissipating component, and
    - a cover glass,
    - wherein the seal components are compressed against the LED base layer by the baffle to provide the ingress protection, and the baffle is mechanically secured through the LED base layer to establish thermal contact between the LED base layer and the heat-dissipating component.

2. The mechanically sealed LED assembly of claim 1, wherein the LED assembly is arranged in a night flight module of the UAV.

3. The mechanically sealed LED assembly of claim 2, wherein the night flight module is detachably attachable to the UAV.

4. The mechanically sealed LED assembly of claim 1, wherein the cover glass is a clear optical glass with a black mask configured to enhance optical transmission from the LEDs while blocking peripheral light to reduce glare or reflections interfering with one or more cameras of the UAV.

5. The mechanically sealed LED assembly of claim 1, wherein the cover glass comprises an adhesive layer used to bond the cover glass to the baffle.

6. The mechanically sealed LED assembly of claim 1, wherein the LED base layer is a base layer of the ingress protection stack and the cover glass is an exterior layer of the ingress protection stack.

7. The mechanically sealed LED assembly of claim 1, wherein the seal components comprise a silicone rubber compressible seal, a stainless steel stiffener, and an adhesive layer.

8. The mechanically sealed LED assembly of claim 1, wherein the baffle is an aluminum baffle.

9. A method of providing improved ingress protection for a light emitting diode (LED) assembly in an unmanned aerial vehicle (UAV), the method comprising:
- providing an ingress protection stack to protect an LED assembly having multiple LEDs from an environmental ingress, the ingress protection stack including:
  - an LED base layer,
  - seal components,
  - a baffle,
  - a heatsink, and
  - a cover glass;
  - wherein providing the ingress protection stack includes mechanically securing the baffle through the LED base layer to the heatsink to establish a thermal contact between the LED base layer and the heatsink for thermal conduction;
- compressing the seal components against the LED base layer by the baffle to provide ingress protection; and
- enclosing the LED assembly within sealed LED cavities to prevent dust or water ingress, thereby forming dry zones around the LEDs and enabling flight in varied environmental conditions without risk of damage to the LEDs.

10. The method of claim 9 further comprising:
- arranging the LED assembly in a night flight module of the UAV, wherein the night flight module is detachably attachable to the UAV.

11. The method of claim 9, wherein enclosing the LEDs within the sealed LED cavities comprises:
- positioning the cover glass formed of a clear optical glass with a black mask, the cover glass being configured to (a) enhance optical output from the LEDs, and (b) block peripheral light to reduce glare or reflections that could interfere with one or more cameras of the UAV.

12. The method of claim 9, wherein providing the ingress protection stack comprises:
- bonding the cover glass to the baffle using an adhesive layer.

13. The method of claim 9, wherein providing the ingress protection stack comprises:
- providing the LED base layer as a base layer of the ingress protection stack and the cover glass as an exterior layer of the ingress protection stack.

14. The method of claim 9, wherein providing the ingress protection stack comprises:
- providing the seal components including a silicone rubber compressible element, a stainless steel stiffener, and an adhesive layer.

15. An unmanned aerial vehicle (UAV) including a night flight module arranged thereon, the night flight module comprising:
- a mechanically sealed light emitting diode (LED) assembly for improved ingress protection, the mechanically sealed LED assembly including an LED assembly comprising:
  - multiple LEDs enclosed within sealed LED cavities configured to prevent dust or water ingress, thereby forming dry zones around the LEDs and enabling flight in varied environmental conditions; and
  - an ingress protection stack comprising a plurality of parts configured to provide ingress protection to the LED assembly, the ingress protection stack including:
    - an LED base layer,
    - seal components,
    - a baffle,
    - a heat-dissipating component, and a cover glass, wherein the seal components are compressed against the LED base layer by the baffle to provide the ingress protection, and the baffle is mechanically secured through the LED base layer to establish thermal contact between the heat-dissipating component and the LED base layer for thermal conduction.

16. The UAV of claim 15, wherein the night flight module is detachably attachable to the UAV.

17. The UAV of claim 16, wherein the LED assembly is configured to enhance optical power output while preventing dust or water ingress to the LEDs.

18. A mechanically sealed light emitting diode (LED) assembly with an improved ingress protection and for use in an unmanned aerial vehicle (UAV), the mechanically sealed LED comprising:

an LED assembly including:

multiple LEDs enclosed within sealed LED cavities configured to prevent dust or water ingress, thereby forming dry zones around the LEDs and enabling flight in varied environmental conditions without risk of damage to the LEDs; and an ingress protection stack configured to provide ingress protection to the LED assembly, the ingress protection stack including:

an LED base layer, seal components, a baffle, and a cover glass, wherein the seal components are compressed against the LED base layer by the baffle to provide the ingress protection, and the cover glass is a clear optical glass with a black mask configured to enhance optical transmission from the LEDs while blocking peripheral light to reduce glare or reflections interfering with one or more cameras of the UAV.

19. A mechanically sealed light emitting diode (LED) assembly with an improved ingress protection and for use in an unmanned aerial vehicle (UAV), the mechanically sealed LED comprising:

an LED assembly including:

multiple LEDs enclosed within sealed LED cavities configured to prevent dust or water ingress, thereby forming dry zones around the LEDs and enabling flight in varied environmental conditions without risk of damage to the LEDs; and an ingress protection stack configured to provide ingress protection to the LED assembly, the ingress protection stack including:

an LED base layer, seal components, a baffle, and a cover glass, wherein the seal components are compressed against the LED base layer by the baffle to provide the ingress protection, and the LED base layer is a base layer of the ingress protection stack and the cover glass is an exterior layer of the ingress protection stack.

20. A mechanically sealed light emitting diode (LED) assembly with an improved ingress protection and for use in an unmanned aerial vehicle (UAV), the mechanically sealed LED comprising:

an LED assembly including:

multiple LEDs enclosed within sealed LED cavities configured to prevent dust or water ingress, thereby forming dry zones around the LEDs and enabling flight in varied environmental conditions without risk of damage to the LEDs; and an ingress protection stack configured to provide ingress protection to the LED assembly, the ingress protection stack including:

an LED base layer, seal components, a baffle, and a cover glass, wherein the seal components are compressed against the LED base layer by the baffle to provide the ingress protection, and the seal components comprise a silicone rubber compressible seal, a stainless steel stiffener, and an adhesive layer.

21. A method of providing improved ingress protection for a light emitting diode (LED) assembly in an unmanned aerial vehicle (UAV), the method comprising:

providing an ingress protection stack to protect an LED assembly having multiple LEDs from an environmental ingress, the ingress protection stack including:

an LED base layer, seal components, a baffle, and a cover glass;

compressing the seal components against the LED base layer by the baffle to provide ingress protection; and enclosing the LED assembly within sealed LED cavities to prevent dust or water ingress, thereby forming dry zones around the LEDs and enabling flight in varied environmental conditions without risk of damage to the LEDs, wherein enclosing the LEDs within the sealed LED cavities includes positioning the cover glass formed of a clear optical glass with a black mask, the cover glass being configured to (a) enhance optical output from the LEDs, and (b) block peripheral light to reduce glare or reflections that could interfere with one or more cameras of the UAV.

22. A method of providing improved ingress protection for a light emitting diode (LED) assembly in an unmanned aerial vehicle (UAV), the method comprising:

providing an ingress protection stack to protect an LED assembly having multiple LEDs from an environmental ingress, the ingress protection stack including:

an LED base layer, seal components, a baffle, and a cover glass, wherein providing the ingress protection stack includes providing the LED base layer as a base layer of the ingress protection stack and the cover glass as an exterior layer of the ingress protection stack;

compressing the seal components against the LED base layer by the baffle to provide ingress protection; and enclosing the LED assembly within sealed LED cavities to prevent dust or water ingress, thereby forming dry zones around the LEDs and enabling flight in varied environmental conditions without risk of damage to the LEDs.

23. A method of providing improved ingress protection for a light emitting diode (LED) assembly in an unmanned aerial vehicle (UAV), the method comprising:

providing an ingress protection stack to protect an LED assembly having multiple LEDs from an environmental ingress, the ingress protection stack including:

an LED base layer,
seal components,
a baffle, and
a cover glass,
wherein providing the ingress protection stack includes providing the seal components including a silicone rubber compressible element, a stainless steel stiffener, and an adhesive layer;
compressing the seal components against the LED base layer by the baffle to provide ingress protection; and
enclosing the LED assembly within sealed LED cavities to prevent dust or water ingress, thereby forming dry zones around the LEDs and enabling flight in varied environmental conditions without risk of damage to the LEDs.

* * * * *